United States Patent
Glennon et al.

(10) Patent No.: US 12,238,384 B2
(45) Date of Patent: Feb. 25, 2025

(54) SWIVEL SEARCH SYSTEM

(71) Applicant: Adeia Media Solutions Inc., San Jose, CA (US)

(72) Inventors: Shelly Glennon, San Jose, CA (US); Robert F Poniatowski, San Jose, CA (US); Bryan James, Menlo Park, CA (US); Brian Beach, Lahaina, HI (US)

(73) Assignee: Adeia Media Solutions Inc., San Jose, CA (US)

( * ) Notice: Subject to any disclaimer, the term of this patent is extended or adjusted under 35 U.S.C. 154(b) by 0 days.

(21) Appl. No.: 18/674,088

(22) Filed: May 24, 2024

(65) Prior Publication Data
US 2024/0373103 A1    Nov. 7, 2024

Related U.S. Application Data

(63) Continuation of application No. 18/219,335, filed on Jul. 7, 2023, now Pat. No. 12,035,013, which is a
(Continued)

(51) Int. Cl.
*H04N 21/482*     (2011.01)
*G06F 16/332*     (2019.01)
(Continued)

(52) U.S. Cl.
CPC ..... *H04N 21/4828* (2013.01); *G06F 16/3325* (2019.01); *G06F 16/7867* (2019.01);
(Continued)

(58) Field of Classification Search
CPC ............ H04N 21/4828; H04N 21/232; H04N 21/2393; H04N 21/242; H04N 21/25891;
(Continued)

(56) References Cited

U.S. PATENT DOCUMENTS

| | | |
|---|---|---|
| 5,532,948 A | 7/1996 | Kohno et al. |
| 5,640,553 A | 6/1997 | Schultz |

(Continued)

FOREIGN PATENT DOCUMENTS

| | | |
|---|---|---|
| WO | 0137465 A2 | 5/2001 |
| WO | 0146843 A2 | 6/2001 |

(Continued)

OTHER PUBLICATIONS

Lin, et al., "Video Collaborative Annotation Forum: Establishing Ground-Truth Labels on Large Multimedia Datasets"; XP-002483852 dated Nov. 18, 2003 (19 pages).

(Continued)

*Primary Examiner* — Anthony Bantamoi
(74) *Attorney, Agent, or Firm* — Haley Guiliano LLP

(57) ABSTRACT

Systems and methods are provided for, in response to determining that an election to opt into a privacy policy has not been received from the user (or that an election to opt out of the privacy policy has been received from the user) using limited functionality of a data provider system to select, from a set of candidate data items and using a particular selection criterion (not based on personal information of the user), data items to be transmitted. System and methods may be further provided for, in response to determining that an election to opt into the privacy policy has been received (or that an election to opt out of the privacy policy has not been received), using full functionality search of the data provider system to select data items from the set of candidate data items based at least in part on the accessed personal information.

20 Claims, 24 Drawing Sheets

Related U.S. Application Data continuation of application No. 17/880,317, filed on Aug. 3, 2022, now Pat. No. 11,743,549, which is a continuation of application No. 17/235,147, filed on Apr. 20, 2021, now Pat. No. 11,695,997, which is a continuation of application No. 16/408,324, filed on May 9, 2019, now Pat. No. 11,012,755, which is a continuation of application No. 12/121,619, filed on May 15, 2008, now Pat. No. 10,313,760.

(60) Provisional application No. 60/930,419, filed on May 15, 2007.

(51) Int. Cl.

| | |
|---|---|
| *G06F 16/78* | (2019.01) |
| *G06F 16/9537* | (2019.01) |
| *G06F 16/955* | (2019.01) |
| *H04N 21/232* | (2011.01) |
| *H04N 21/239* | (2011.01) |
| *H04N 21/242* | (2011.01) |
| *H04N 21/258* | (2011.01) |
| *H04N 21/2665* | (2011.01) |
| *H04N 21/2747* | (2011.01) |
| *H04N 21/41* | (2011.01) |
| *H04N 21/433* | (2011.01) |
| *H04N 21/45* | (2011.01) |
| *H04N 21/462* | (2011.01) |
| *H04N 21/472* | (2011.01) |
| *H04N 21/4788* | (2011.01) |
| *H04N 21/63* | (2011.01) |
| *H04N 21/6587* | (2011.01) |
| *H04N 21/858* | (2011.01) |

(52) U.S. Cl.
CPC ........ *G06F 16/9537* (2019.01); *G06F 16/955* (2019.01); *H04N 21/232* (2013.01); *H04N 21/2393* (2013.01); *H04N 21/242* (2013.01); *H04N 21/25891* (2013.01); *H04N 21/2665* (2013.01); *H04N 21/2747* (2013.01); *H04N 21/4135* (2013.01); *H04N 21/4334* (2013.01); *H04N 21/4532* (2013.01); *H04N 21/4622* (2013.01); *H04N 21/47214* (2013.01); *H04N 21/4788* (2013.01); *H04N 21/4825* (2013.01); *H04N 21/632* (2013.01); *H04N 21/6587* (2013.01); *H04N 21/8586* (2013.01); *Y10S 707/914* (2013.01); *Y10S 707/915* (2013.01); *Y10S 707/916* (2013.01)

(58) Field of Classification Search
CPC ........... H04N 21/2665; H04N 21/2747; H04N 21/4135; H04N 21/4334; H04N 21/4532; H04N 21/4622; H04N 21/47214; H04N 21/4788; H04N 21/4825; H04N 21/632; H04N 21/6587; H04N 21/8586; G06F 16/3325; G06F 16/7867; G06F 16/9537; G06F 16/955; Y10S 707/914; Y10S 707/915; Y10S 707/916
See application file for complete search history.

(56) References Cited

U.S. PATENT DOCUMENTS

| | | | |
|---|---|---|---|
| 5,801,787 | A | 9/1998 | Schein et al. |
| 5,872,588 | A | 2/1999 | Aras et al. |
| 6,005,565 | A | 12/1999 | Legall et al. |
| 6,681,395 | B1 | 1/2004 | Nishi |
| 7,177,589 | B1 | 2/2007 | Lynch |
| 7,296,032 | B1 | 11/2007 | Beddow |
| 7,324,961 | B2 | 1/2008 | Al-Azzawe |
| 7,747,132 | B2 | 6/2010 | Poslinski |
| 7,890,490 | B1 | 2/2011 | Bovenschulte et al. |
| 7,898,394 | B2 | 3/2011 | Hibbets |
| 8,301,648 | B2 | 10/2012 | Poniatowski et al. |
| 8,386,465 | B2 | 2/2013 | Ansari et al. |
| 8,464,295 | B2 | 6/2013 | Stallings et al. |
| 8,528,019 | B1 | 9/2013 | Dimitrova et al. |
| 8,880,529 | B2 | 11/2014 | Klar et al. |
| 8,914,394 | B1 | 12/2014 | Dubois et al. |
| 8,959,099 | B2 | 2/2015 | Poniatowski et al. |
| 9,288,548 | B1 | 3/2016 | Dubois et al. |
| 9,424,264 | B2 | 8/2016 | Barton et al. |
| 10,313,760 | B2 | 6/2019 | Glennon et al. |
| 11,012,755 | B2 | 5/2021 | Glennon et al. |
| 11,695,997 | B2 | 7/2023 | Glennon et al. |
| 11,743,549 | B2 | 8/2023 | Glennon et al. |
| 12,035,013 | B2 | 7/2024 | Glennon et al. |
| 2002/0009285 | A1 | 1/2002 | Safadi et al. |
| 2002/0042921 | A1 | 4/2002 | Ellis |
| 2002/0083153 | A1 | 6/2002 | Sweatt et al. |
| 2002/0143525 | A1 | 10/2002 | Lewis |
| 2002/0169656 | A1 | 11/2002 | Al-Azzawe |
| 2003/0014753 | A1 | 1/2003 | Beach et al. |
| 2003/0028896 | A1 | 2/2003 | Swart et al. |
| 2003/0066093 | A1 | 4/2003 | Cruz-Rivera et al. |
| 2003/0067554 | A1 | 4/2003 | Klarfeld et al. |
| 2003/0151621 | A1 | 8/2003 | McEvilly et al. |
| 2003/0196164 | A1 | 10/2003 | Gupta et al. |
| 2003/0226147 | A1 | 12/2003 | Richmond et al. |
| 2004/0013409 | A1 | 1/2004 | Beach et al. |
| 2004/0021685 | A1 | 2/2004 | Denoue et al. |
| 2004/0024739 | A1 | 2/2004 | Copperman et al. |
| 2004/0024886 | A1 | 2/2004 | Saxena |
| 2004/0078816 | A1 | 4/2004 | Johnson |
| 2004/0096184 | A1 | 5/2004 | Poslinski |
| 2004/0128317 | A1 | 7/2004 | Sull et al. |
| 2004/0158856 | A1 | 8/2004 | Grooters et al. |
| 2004/0187164 | A1 | 9/2004 | Kandasamy et al. |
| 2004/0194141 | A1 | 9/2004 | Sanders |
| 2004/0194741 | A1 | 10/2004 | Sun et al. |
| 2004/0221310 | A1 | 11/2004 | Herrington et al. |
| 2004/0260702 | A1 | 12/2004 | Cragun et al. |
| 2005/0131866 | A1 | 6/2005 | Badros et al. |
| 2005/0182792 | A1 | 8/2005 | Israel et al. |
| 2005/0204385 | A1 | 9/2005 | Sull et al. |
| 2005/0234958 | A1 | 10/2005 | Sipusic et al. |
| 2005/0240963 | A1 | 10/2005 | Preisman et al. |
| 2006/0015580 | A1 | 1/2006 | Gabriel et al. |
| 2006/0015925 | A1 | 1/2006 | Logan |
| 2006/0041910 | A1 | 2/2006 | Hatanaka et al. |
| 2006/0101504 | A1 | 5/2006 | Aravamudan et al. |
| 2006/0117351 | A1 | 6/2006 | Sanders et al. |
| 2006/0146436 | A1 | 7/2006 | Goodwin et al. |
| 2006/0167876 | A1 | 7/2006 | Benitez et al. |
| 2006/0167903 | A1 | 7/2006 | Smith et al. |
| 2006/0168231 | A1 | 7/2006 | Diperna |
| 2006/0184983 | A1 | 8/2006 | Casey |
| 2006/0242554 | A1 | 10/2006 | Gerace et al. |
| 2006/0271519 | A1 | 11/2006 | Blackwood et al. |
| 2007/0078832 | A1 | 4/2007 | Ott et al. |
| 2007/0100799 | A1 | 5/2007 | Rose et al. |
| 2007/0156844 | A1 | 7/2007 | Lee |
| 2007/0174471 | A1 | 7/2007 | Van |
| 2007/0199038 | A1 | 8/2007 | Choi |
| 2007/0204299 | A1 | 8/2007 | Vosseller |
| 2007/0209049 | A1 | 9/2007 | Kelly et al. |
| 2007/0212025 | A1 | 9/2007 | Barton et al. |
| 2007/0214488 | A1 | 9/2007 | Nguyen et al. |
| 2007/0219856 | A1 | 9/2007 | Ahmad-Taylor |
| 2007/0223870 | A1 | 9/2007 | Farling et al. |
| 2007/0239335 | A1 | 10/2007 | Tanaka et al. |
| 2007/0248055 | A1 | 10/2007 | Jain et al. |
| 2008/0005107 | A1 | 1/2008 | Funaki |
| 2008/0022038 | A1 | 1/2008 | Akagawa et al. |
| 2008/0066099 | A1 | 3/2008 | Brodersen et al. |
| 2008/0092168 | A1 | 4/2008 | Logan et al. |
| 2008/0103996 | A1 | 5/2008 | Forman et al. |
| 2008/0113658 | A1 | 5/2008 | Bloebaum et al. |

(56) References Cited

U.S. PATENT DOCUMENTS

| | | |
|---|---|---|
| 2008/0115168 A1 | 5/2008 | Adwankar et al. |
| 2008/0134866 A1 | 6/2008 | Brown |
| 2008/0148322 A1 | 6/2008 | Howcroft |
| 2008/0168503 A1 | 7/2008 | Sparrell |
| 2008/0172362 A1 | 7/2008 | Shacham et al. |
| 2008/0215366 A1 | 9/2008 | Robson et al. |
| 2008/0228749 A1 | 9/2008 | Brown |
| 2008/0249991 A1 | 10/2008 | Valz |
| 2008/0288460 A1 | 11/2008 | Poniatowski et al. |
| 2008/0288461 A1 | 11/2008 | Glennon et al. |
| 2008/0313272 A1 | 12/2008 | Nguyen et al. |
| 2009/0094520 A1 | 4/2009 | Kulas |
| 2009/0240692 A1 | 9/2009 | Barton et al. |
| 2009/0300683 A1 | 12/2009 | Rynkowski |
| 2009/0324195 A1 | 12/2009 | Poslinski |
| 2010/0154005 A1 | 6/2010 | Baxter |
| 2010/0186038 A1 | 7/2010 | Thomas et al. |
| 2010/0232656 A1 | 9/2010 | Ryu |
| 2010/0251162 A1 | 9/2010 | Stallings et al. |
| 2011/0296456 A1 | 12/2011 | Pandala |
| 2013/0111527 A1 | 5/2013 | Poniatowski et al. |
| 2013/0347040 A1 | 12/2013 | Baxter |
| 2015/0058379 A1 | 2/2015 | Barton et al. |
| 2015/0131974 A1 | 5/2015 | Poniatowski et al. |
| 2016/0198231 A1 | 7/2016 | Dubois et al. |
| 2021/0243505 A1 | 8/2021 | Glennon et al. |
| 2022/0377430 A1 | 11/2022 | Glennon et al. |
| 2024/0040204 A1 | 2/2024 | Glennon et al. |

FOREIGN PATENT DOCUMENTS

| | | |
|---|---|---|
| WO | 02069629 A2 | 9/2002 |
| WO | 0180079 A3 | 12/2003 |
| WO | 2005101411 A2 | 10/2005 |

OTHER PUBLICATIONS

Reti et al., "DiMaS: distributing multimedia on peer-to-peer file sharing networks", In proceedings of the 12th annual ACM international conference of multimedia, published Oct. 10, 2004, 2 pages.

Schlining, et al., "MBARI's Video Annotation and Reference System"; XP031046488 dated Sep. 1, 2006 (5 pages).

TiVo, "2006 Service Update Guide for TiVo Series2 Digital Video Recorders," Jan. 31, 2006, TiVo Inc. (78 pages).

TiVo Central

Now Playing List
Watch Live TV
Find Programs 202
Music, Photos, Products, & More
Showcases & TV Guide®
Messages & Settings
Build your dream Lexus ES-350

FIG. 4

Swivel Search

Search for any word or phrase in program titles, people, or tags. Tags are keywords that are attached to the most popular programs. Swivel Search finds both broadcast programming and downloads.

400  Use the arrows to move around the letter grid and press SELECT on the first few letters of your search term.

Then press RIGHT arrow to choose an item in the list.

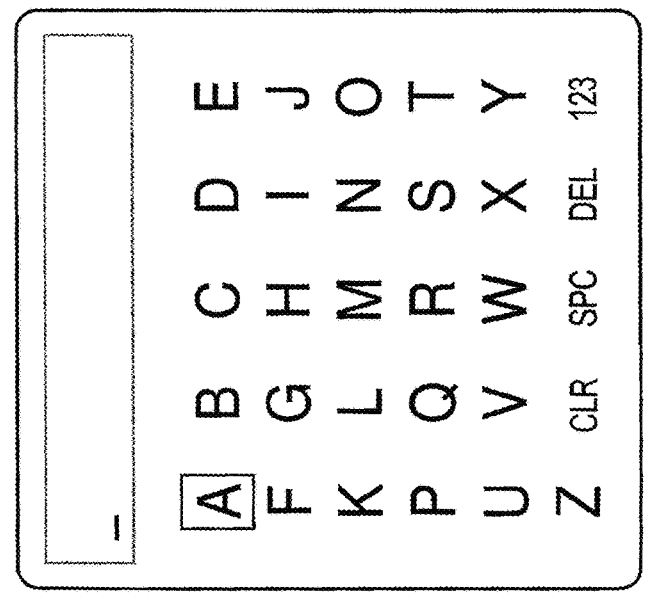

Press ENTER for more options

Swivel Search  550

Search for any word or phrase in program titles, people, or tags. Tags are keywords that are attached to the most popular programs. Swivel Search finds both broadcast programming and downloads.

GA_  500

| A | B | C | D | E 552 |
|---|---|---|---|---|
| F | G | H | I | J |
| K | L | M | N | O |
| P | Q | R | S | T |
| U | V | W | X | Y |
| Z | CLR | SPC | DEL | 123 |

Gamble, Nathan
Gamble, Mason        554
Gamble, Sera
Gamble, Tim 504
GAMBLING 502
Gambon, Michael 506
Game, The
Gandhi

FIG. 6

GAMBLING
Tag 606

Related Tags

Programs matching this tag: 600

Casino Royale (2006) 602

Celebrity Poker Showdown

Lucky (2003)

Poker 101

Poker After Dark

Poker Superstars Invitation...

Professional Poker Tour

Rounders (1998) 604

Texas Hold em Secrets

Casino Royale (2006) 608
In his first mission, James Bond must stop Le Chiffre from winning a high-stakes poker tournament at Casino...

Starring:
Daniel Craig
Eva Green 610
Mads Mikkelsen
Judi Dench

More program info... 612

Record this program 614

Press  to start a new search

FIG. 7

"GAMBLING"
Tag 700

Related Tags
Programs matching this tag: 702
Casino Royale (2006)
Celebrity Poker Showdown
Lucky (2003)
Poker 101
Poker After Dark
Poker Superstars Invitation...
Professional Poker Tour
Rounders (1998) 704
Texas Hold em Secrets Rounders (1998)
*A young man is a reformed gambler who must return to playing big stakes poker to help a friend pay off loan...*

Starring:
Matt Damon
Edward Norton
Paul Cicero
John Torturro

More program info...
Download this program 706

Press  to start a new search

FIG. 8

"GAMBLING"
Tag

Related Tags
Programs matching this tag:
Casino Royale (2006)
Celebrity Poker Showdown
Lucky (2003)
Poker 101
Poker After Dark
Poker Superstars Invitation...
Professional Poker Tour
Rounders (1998) 802
Texas Hold em Secrets Rounders (1998)
*A young man is a reformed gambler who must return to playing big stakes poker to help a friend pay off loan...*
Starring: 806
Matt Damon 804
Edward Norton
Paul Cicero
John Torturro More program info...
Download this program Press  to start a new search

FIG. 9

Matt Damon
Actor

902

Biography 904

906 Upcoming programs this actor is in:

John Grisham's The Rainmaker

*An idealistic young lawyer and his cynical partner take on a powerful law firm representing a corrupt insurance...*

Also starring:
- Claire Danes
- Jon Voight
- Mary Kay Place
- Danny DeVito
- Another actor More info...

Record this program

John Grisham's The Rainm...
The Bourne Identity (2002)
Will & Grace
Late Show With David Lett...
Good Morning America
Confessions of a Dangerous...

Also in (not currently airing):
Rounders (1998)
Good Will Hunting (1997)

Press ⓘ to start a new search

FIG. 11

Now Playing List

1102

- *Enter TiVo KidZone*
- Thomas & Friends — Sat 9/2
- ● Rocketboom — Sat 9/2
- ▇ Home Movies: One True Media (3) — Fri 9/1
- ▇ Sports by Sports Illustrated (5) — Thu 8/31
- ⟨ ● How I Met Your Mother  1104  Thu 8/31 ⟩
- ● West Wing, The — Thu 8/31
- ▇ POKER (3) — Wed 8/30
- — HD Recordings (2) — Wed 8/30

⌄  Groups sorted by date (press ENTER to change)

FIG. 12
Program
How I Met Your Mother 1202
"Swarley" (2006) When the gang views a tape from Barney's ex-girlfriend, everyone must share their most embarrassing moment in order to get him to tell the full story about the tape. HDTV, CC, Repeat.
1204
1208
Thu 8/31 8:30 pm 81 CBSW
Duration 0:30
Rated TV-PG
Comedy
Press INFO for details
1206
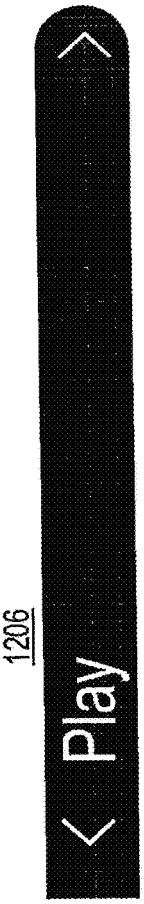
Play
Keep until...
Delete now
If you like this...
More options

Program 1300

How I Met Your Mother

"Swarley" (2006) When the gang views a tape from Barney's ex-girlfriend, everyone must share their most embarrassing moment in order to get him to tell the full story about the tape. HDTV, CC, Repeat.

Play
Keep until...
Delete now
Save to VCR
If you like this...

Swivel Search 1304
View upcoming episodes
Modify this Season Pass

More options 1302

FIG. 14

How I Met Your Mother 1400
Series

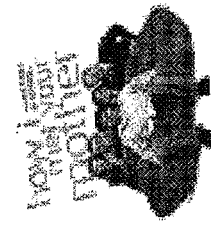

Comedy, Sitcom (2005 - Current) 1406
Wednesday 8:00 pm ABC
TV-PG

1410
*A love story in reverse. Egged on by his best friend's upcoming nuptials, Ted (Radnor) believes he finds the woman of his dreams in Robin (Smulders) -- though destiny might have something different in mind.*

Episode Guide 1408
Record this program

Press  to start a new search

Program Synopsis
Upcoming Showings 1404
Available Downloads 1420
If You Like This....
Starring: 1402
 Neil Patrick Harris
 Jason Segel
 Josh Radner
 Cobie Smulders
 Alyson Hannigan
Guest Starring:

FIG. 15
How I Met Your Mother 1500
Series
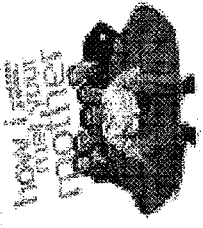
Program Synopsis
< Upcoming Showings 1502 >
Available Downloads
If You Like This....
Starring:
Neil Patrick Harris
Jason Segel
Josh Radner
Cobie Smulders
Alyson Hannigan
Guest Starring:
There are 6 upcoming showings.
1504
| Mon 12/18 | 8:00 pm | 5 | KPIX |
| Mon 12/18 | 8:00 pm | 5-1 | KPIXDT |
| Wed 12/20 | 8:30 pm | 5 | KPIX |
| Wed 12/20 | 8:30 pm | 5-1 | KPIXDT |
| Mon 12/25 | 8:00 pm | 5 | KPIX |
| Mon 12/25 | 8:00 pm | 5-1 | KPIXDT |
Press  to start a new search

FIG. 16

How I Met Your Mother 1600
Series

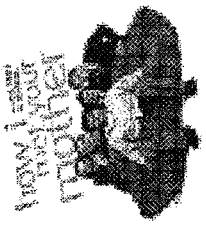

Program Synopsis

Upcoming Showings

< Available Downloads 1602 >

There are 24 available episodes. 1604

1606
- Pilot
- Purple Giraffe
- Sweet Taste of Liberty
- Return of the Shirt
- Okay Awesome
- The Slutty Pumpkin
- Matchmaker If You Like This....

Starring:
Neil Patrick Harris
Jason Segel
Josh Radner
Cobie Smulders
Alyson Hannigan Guest Starring:

Press ⊙ to start a new search

FIG. 17

How I Met Your Mother Series

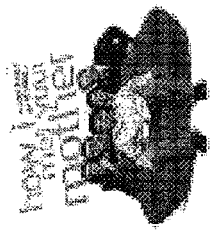

Program Synopsis

Upcoming Showings

Available Downloads

<u>1704</u>

There are 6 upcoming programs or available downloads that are similar to "How I Met Your Mother"

< If You Like This  <u>1702</u>  >

Starring:
- Neil Patrick Harris
- Jason Segel
- Josh Radner
- Cobie Smulders
- Alyson Hannigan Guest Starring:

Friends <u>1706</u>

My Name is Earl <u>1708</u>

New York City Hotspots

The Class

The Office

Two and a Half Men

Press ⊙ to start a new search

FIG. 18
Doogie Howser Series
Directed by: David E. Kelley
David E. Kelley  1802 
Written by:
Steven Bochco
Nat Bernstein
Also Starring:
Kathryn Layng
Markus Redmond
Lucy Boryer
Lisa Dean Ryan
Neil Flynn
Upcoming programs directed by: 1804
Boston Legal  1806
Boston Public
Chicago Hope  1808
The Practice
More info...
Press ⊙ to start a new search FIG. 19
Doogie Howser 1900
Series
Mitchell Anderson
Andrew Bilgore
Peter Riga 1920
Tags: 1902
Coming of Age 1904
Doctor 1906
Medical 1908
Prodigy 1910
1912
There are 3 upcoming programs or available downloads tagged with this keyword.
E.R. 1914
Grey's Anatomy 1916
Scrubs 1918
Press ⊙ to start a new search FIG. 22
How I Met Your Mother
Episode Guide
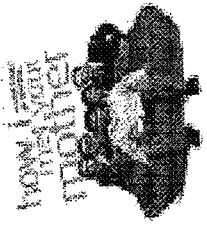
2200
Season 1
Season 2  2201
Season 3
Season 4
There are 24 episodes in Season 1.
Pilot
Purple Giraffe
Sweet Taste of Liberty
Return of the Shirt
Okay Awesome
The Slutty Pumpkin
Matchmaker
2202
Press  to start a new search

SWIVEL SEARCH SYSTEM

CROSS-REFERENCE TO RELATED APPLICATIONS

This application is a continuation to U.S. patent application Ser. No. 18/219,335, filed Jul. 7, 2023, which is a continuation of U.S. patent application Ser. No. 17/880,317, filed Aug. 3, 2022, (now U.S. Pat. No. 11,743,549), which is a continuation of U.S. patent application Ser. No. 17/235,147, filed Apr. 20, 2021, (now U.S. Pat. No. 11,695,997), which is a continuation of U.S. patent application Ser. No. 16/408,324, filed May 9, 2019, (now U.S. Pat. No. 11,012,755), which is a continuation of U.S. patent application Ser. No. 12/121,619, filed May 15, 2008, (now U.S. Pat. No. 10,313,760), which claims benefit to U.S. Provisional Application 60/930,419, filed May 15, 2007, the entire contents of which are hereby incorporated by reference herein.

This application is related to U.S. patent application Ser. No. 12/121,557, now U.S. Pat. No. 8,301,648, filed May 15, 2008, U.S. patent application Ser. No. 12/121,672, now U.S. Pat. No. 9,288,548, filed May 15, 2008, and U.S. patent application Ser. No. 12/121,688, now U.S. Pat. No. 8,914,394, filed May 15, 2008, each of which is owned by Applicant and is incorporated herein in its entirety by this reference thereto.

FIELD OF THE INVENTION

The present invention relates to performing searches on digital video recorders ("DVRs").

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the DVR to the consumer world has revolutionized the way users watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

A user may wish to view information about a television program or movie that they have previously recorded. When a user requests to view information about a specific television program, the information may include a synopsis of the plot of the program and the credits for the program that include the primary actors and director. If a user wanted to view any content that is associated with any of the information that is being viewed, such as the actor that appears in the television program, then the user would have to begin a new search for the actor and then find content for that actor.

Similarly, a user may wish to search and view information about a particular television program. The user navigates to a search screen and enters letters corresponding to the title of the television program. When the television program is found, the plot and credits of that particular television program appears. The user then may wish to search based upon information about the particular program such as an actor, but in order to accomplish that task, the user performs an entirely new search.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an example of a DVR-presented main menu which contains a menu item whose selection initiates a process for finding program content on the DVR, according to an embodiment of the invention;

FIG. 4 illustrates an example of a DVR-presented screen for progressive search that allows for the search of any word in program titles or tags, according to an embodiment of the invention;

FIG. 6 illustrates an example of a DVR-presented screen that displays program content information for a particular content when the cursor is located on that particular content, according to an embodiment of the invention;

FIG. 7 illustrates an example of a DVR-presented screen that displays program content information for a particular content when the cursor is moved to that particular content, according to an embodiment of the invention;

FIG. 8 illustrates an example of a DVR-presented screen that displays program content information and that the data in the program content information is selectable when the program is selected, according to an embodiment of the invention;

FIG. 9 illustrates an example of a DVR-presented screen that displays content items associated with an actor selected in the progressive search, according to an embodiment of the invention;

FIG. 11 illustrates an example of a DVR-presented screen that displays previously recorded program content that may be viewed, according to an embodiment of the invention;

FIG. 12 illustrates an example of a DVR-presented screen that displays program content information for a particular program when that particular program is being viewed, according to an embodiment of the invention;

FIG. 14 illustrates an example of a DVR-presented screen that displays program content information for a particular program within progressive search, according to an embodiment of the invention;

FIG. 15 illustrates an example of a DVR-presented screen that displays upcoming show times of a program when the "Upcoming Showings" option is selected in progressive search, according to an embodiment of the invention;

FIG. 16 illustrates an example of a DVR-presented screen that displays available downloads of a program when the "Available Downloads" option is selected in progressive search, according to an embodiment of the invention;

FIG. 17 illustrates an example of a DVR-presented screen that displays related programs when the "If you like this" option is selected in progressive search, according to an embodiment of the invention;

FIG. 18 illustrates an example of a DVR-presented screen that displays associated content of a particular director when the particular director is selected in progressive search, according to an embodiment of the invention;

FIG. 19 illustrates an example of a DVR-presented screen that displays related tags in progressive search, according to an embodiment of the invention;

FIG. 22 illustrates an example of a user interface screen that displays an episode guide according to an embodiment of the invention, according to an embodiment of the invention.

DETAILED DESCRIPTION

Figure 1A:
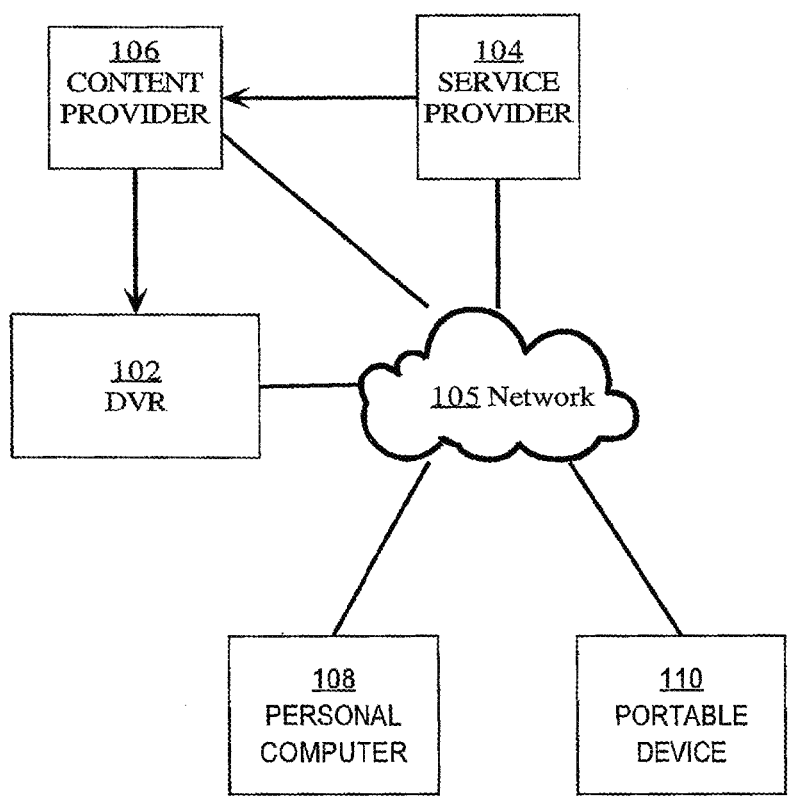
FIG. 1A illustrates an example system in which program data progressive search may be implemented, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural Overview
   3.0 Example Techniques and Processes
      3.1 Entering Swivel Search from a Search
      3.2 Entering Swivel Search from Viewed Content
      3.3 Options in Swivel Search
      3.3.1 Tags
      3.4 Privacy in Swivel Search
      3.5 Additional Features in Swivel Search
      3.6 Unified Searching of Broadband and Broadcast Multimedia Content
      3.7 Filtering Broadband and Broadcast Multimedia Content Search Results
   4.0 Implementation Mechanisms 1.0 General Overview The needs identified in the foregoing Background, and other needs and objects that will become apparent from the following description, are achieved in the present invention, which comprises methods to perform universal swivel search.

As the abundance of programming content proliferates, users may wish to perform searches based upon any data related to that programming content. Upon receiving related data, the user may wish to "swivel" through the initial search by selecting any term from the initial search results and conducting a further search of that selected term. This swivel search may progress through many layers of searching in order to reach particular information that the user deems useful. As used herein, "universal swivel search" refers to the interface and technique to search for content and any data that results based upon that content, with the ability to progress through many layers of searching. In addition, terms other than "swivel" search may be used to refer to the interface and technique, such as, but not limited to, "progressive" search or "pivot" search.

In an embodiment, an interface is provided that allows users to select any term or data that is related to a particular content in order to find all other content associated with that selected term or data. As used herein, data and terms related to a particular content may include, but is not limited to credits, tags, or related programs. Credits may refer to, but is not limited to actors, character names, directors, producers, writers, production studio, or any other information that relates to the production of a particular content. Related programs are programs that may be similar to the selected content and may be similar based upon any type of criteria or by any means. For example, related programs might be determined based upon aggregating data from many different users, through an editorial service that originates from a service provider, or based upon any criteria that may be used to determine related programming. Tags refer to a set of words, pictures or other media used to link various pieces of content together and are further discussed in section 3.3.1 of this Application.

As an example, a user views the program details for a particular episode of the television program "24," an action drama television show depicting the life of a U.S. government agent in real-time, based upon a previous recording. From the program details screen, the user is able to see "Kiefer Sutherland" and "Carlos Bernard" as actors of the particular episode of the television series. The director and writer also appear for the particular episode. Upcoming broadcasts in the near future and available broadband content that may be downloaded for "24" appear. Tags related to the series, such as "Treason," "Abduction," and "Crime" appear along with content that may be downloaded or scheduled to broadcast that are related to "24." For example, shows that might be related to "24" are "Prison Break," a television drama about a man wrongfully sentenced and his brother's plan to help him escape from prison, and "The Unit," a television drama about a top secret military unit.

From the program details screen, the user is able to select particular episodes of "24" to record as well as broadband content that may be downloaded. However, to have a more effective search, the screen that contains the related content data may also be searchable. For example, when the user selects Kiefer Sutherland from the program details screen, a screen that contains content where Kiefer Sutherland appears or that is related to Kiefer Sutherland is shown. In an embodiment, any of the content related to Kiefer Sutherland is selectable to view data related to that selected content. When data related to the selected content appears, the user may select any term or data in order to view content related to that selected data. With each succeeding screen of content and associated data, the user may select terms to "progress," "swivel," or "pivot" from one search to the next.

In an embodiment, a service receives search requests from client systems and performs an integrated search across databases containing informational data for broadcast content and broadband content using the received search criteria. The service may be owned or operated by a service provider, third party, etc. Owners of client devices are charged a fee by the service provider, third party, etc., for access to the database search service, content recording scheduling, content download service, etc. A user enters search criteria on a client device. The client device can be a DVR, set-top box, cell phone, handheld device, laptop, PC, etc., for example.

The client device formulates a search request given the user's input and sends the search request to the service. The service receives the search request from the client device and formulates a query for at least one broadband database and at least one broadcast database. The broadband database contains data from partners of the service provider such as: Amazon.com, RocketBoom, dLife®, The New York Times®, and CNET®. Broadband databases may exist at each partner's server. The service queries each partner's database with a compatible query that the service creates using information regarding the type of database queries each partner's database requires. Data in the broadband database(s) consists of links to multimedia content that are available for download from the partners. The data also includes information describing the multimedia content such as: program description, program synopsis, program rating, actors, directors, producers, program title, pricing, etc., as well as search data tags.

In an embodiment, the partners pay the service provider a fee for placing data in the database or for having their database searched by the service. For example, partners may pay a fixed fee or a fee based on the number of times that the service queries the partner's database.

The broadcast database contains data from electronic program guide (EPG) providers such as Tribune Media Services®. The EPG data describes programs that are available from many different broadcasters and services such as: DirecTV®, Comcast®, Cable Vision®, etc. The EPG data contains information describing the program such as the channel that the program is available on, program description, program synopsis, program rating, actors, directors, producers, program title, etc., as well as search data tags.

The service performs searches on both databases using the search queries that it created. The databases can be databases that the service can directly access or database servers hosting the databases or other database services. The service receives or generates results from the search queries and organizes the retrieved information into a format that the client device can use.

In an embodiment, the service also has access to its own client device database where the service stores information regarding the status of all the client devices in communication with the service. The client database includes, among other information, the multimedia content that the client devices have recorded. The service can include in the search results that concern broadband content, multimedia content that is available to download from other client devices. A client device can request downloads of multimedia content from multiple client devices and receive segments of the multimedia content from those client devices.

The client device receives the search results from the service. The client device processes the search results and displays the search results in a list to the user. The service creates the user interface screen for the client device to display. Each time a client device sends a search request to the service, the service formats the data received from the searches of the databases into a user interface screen that is presentable by the client device. The client device receives the user interface screen and displays the screen as formatted by the service. The screen information instructs the client device on how it should respond to any key presses by the user.

2.0 Structural Overview

FIG. 1A illustrates an example system in order to perform progressive search, according to an embodiment. The system contains at least one client device such as DVR 102 which is communicatively coupled to network 105 through any communication interface, such as an Ethernet interface or wireless communications port. The functionality of a DVR is typified in U.S. Pat. No. 6,233,389, which is owned by the Assignee and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and may be coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data enable DVR 102 to operate independently of service provider 104 to satisfy user interests. In another embodiment, DVR 102, personal computer 108, and portable device 110 can communicate with each other to transfer content, metadata, or any other data through network 105, communication connection, or any local network.

In another embodiment, content provider 106 may provide, to service provider 104, content data or any metadata, including promotional data, icons, web data, and other information. Service provider 104 may then interpret the metadata and provide the content data metadata to DVR 102, personal computer 108, or portable device 110.

Figure 1B:
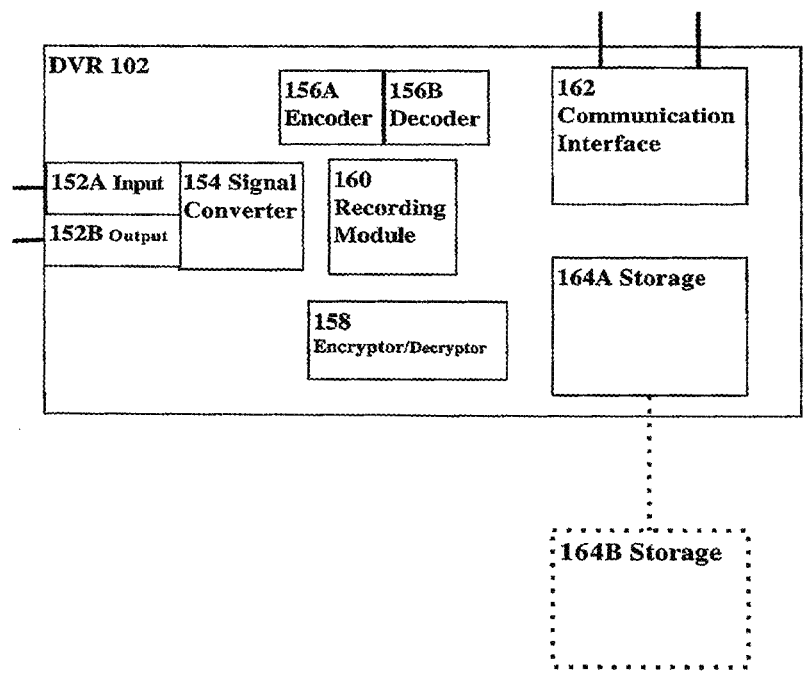
FIG. 1B is a block diagram illustrating a general overview of the components of a Digital Video Recorder (DVR), according to an embodiment of the invention.

Referring to FIG. 1B, in an embodiment, DVR 102 generally comprises a plurality of components, signified by Signal Converter 154, that are necessary to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 152A. Input 152A may comprise a plurality of tuning modules that allow a plurality of signals to be received and recorded simultaneously. For example, a TV input stream received by input 152A may take the form of a National Television Standards Committee (NTSC) compliant signal or a PAL compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording Module 160 records the incoming data stream by storing the digital data stream on at least one storage facility, signified by Storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 102 may utilize a Digital Visual Interface port (DVI) for sending digital signals to a TV via a DVI cable.

DVR 102 also includes a Communication Interface 162, through which the DVR 102 communicates with Network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via Encoder 156A and Decoder 156B into a plurality of formats for playback, storage or transfer. According to one embodiment of the invention, encoder 156A produces MPEG streams. According to another embodiment of the invention, encoder 156A produces streams that are encoded using a different codec. Decoder 156B decodes the streams encoded by encoder 156A or streams that are stored in the format in which the streams were received using an appropriate decoder. DVR 102 can also encrypt or decrypt digital data signals using Encryptor/Decryptor 158 for storage, transfer or playback of the digital data signals.

In one embodiment, DVR 102 communicates with Service Provider 104, which provides program guide data, graphical resources such as brand icons and pictures, service information, software programs, advertisements, and other forms of data that enable DVR 102 to operate independently of the Service Provider 104 to perform autonomous recording functions. Communication between DVR 102 and Service Provider 104 utilizes a secure distribution architecture to transfer data between the DVR 102 and the Service Provider 104 such that both the service data and the user's privacy are protected.

3.0 Example Techniques and Processes 3.1 Entering Swivel Search from Search

In an embodiment, a user may enter the swivel search system by first performing a search for any type of term. The user begins a search as the client device (e.g., DVR 102) displays a main menu. An example is illustrated in FIG. 2. The DVR may cause such a menu (and other menus, screens, dialogs, and user interfaces described herein) to be displayed by sending signals to a television set, monitor, or any other device capable of visual display. A user may use a remote control (which is configured to operate with the DVR) to select, from among the several menu items, a particular menu item in which the user is interested. As shown in FIG. 2, among the other user-selectable options shown in the main menu 200 is a particular item whose selection causes the DVR to initiate a process for entering an area to perform searches. In FIG. 2, this particular menu item is labeled, "Find Programs" 202, however, this label may vary from implementation to implementation.

Figure 3:
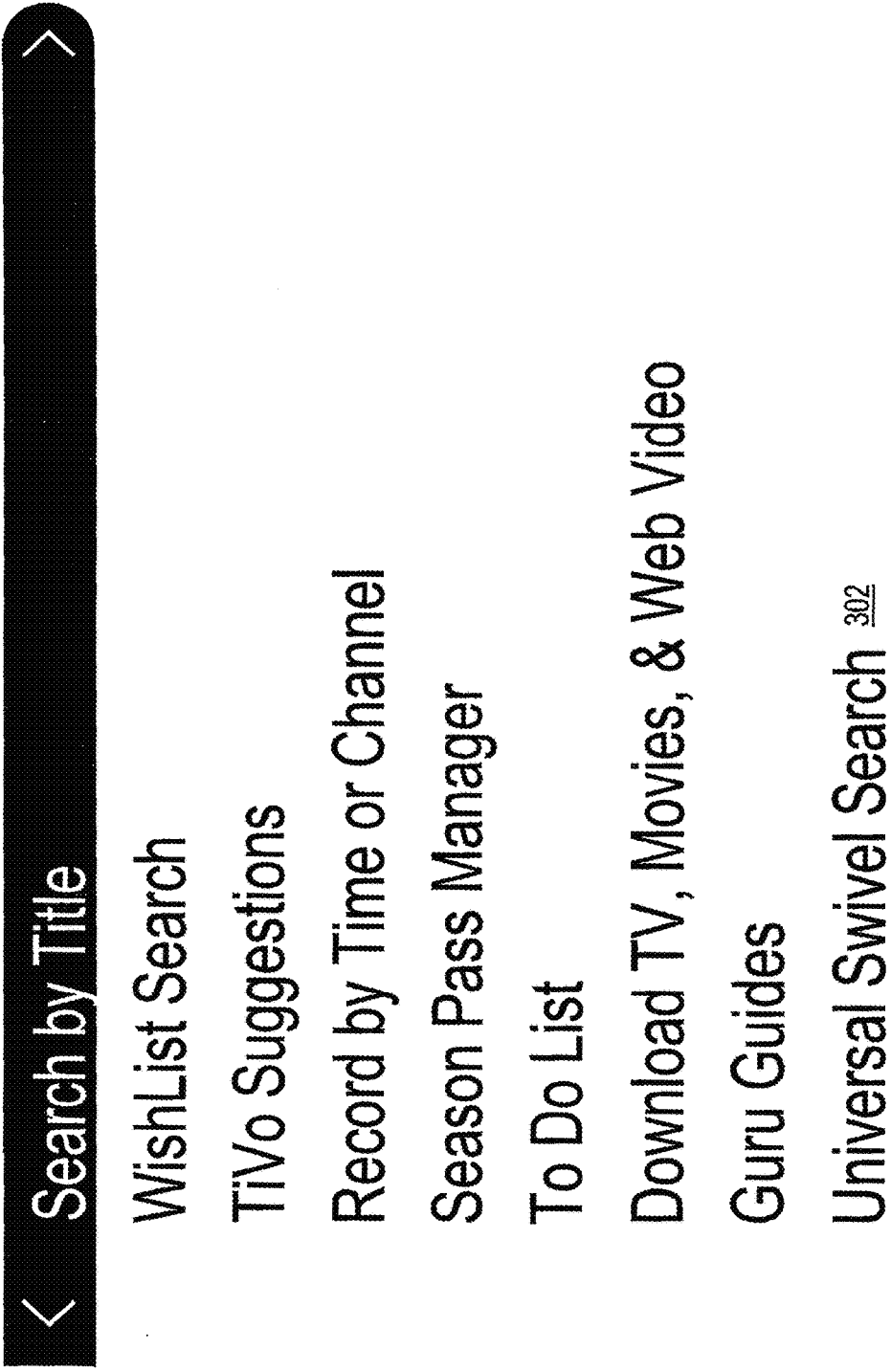
FIG. 3 illustrates an example of a "Find Programs" menu that a DVR displays that contains a menu item whose selection initiates a process for progressive search on the DVR, according to an embodiment of the invention.

Once the user enters the "Find Programs" area, FIG. 3 displays an example of the menu options 300 that may occur, according to an embodiment. A particular choice among the menu options is "Universal Swivel Search," 302 though this label may vary from implementation to implementation. Other labels may include, but is not limited to "Swivel Search" and "Progressive Search." Selecting the item "Universal Swivel Search" 302 sends the user to the screen illustrated in FIG. 4.

In an embodiment, the swivel search system is initiated after a search term is entered by the user. A user commences a search by submitting alphanumeric characters or symbols that correspond to a particular search term that the user is interested. FIG. 4 illustrates an example of a DVR-presented screen that allows for the search of a word or phrase that corresponds to program data. In an embodiment, program data comprises program titles, people, and tags. In another embodiment, other categories of search criteria are included or excluded based upon the services offered by the service or its partners and the availability of searchable data. As used herein, a "program title" refers to, but is not limited to, the title of a television show, movie, downloadable content, or any other viewable content available, to the user. As used herein, the term, "people," may be used to refer to any individual or character that may appear, or is involved in the production, of any available content. These may include, but is not limited to, actors, writers, directors, character names, or producers. An alternative term that may also be used in place of people may be "credits." The term, "tags," is further described in section 3.3.1 of this Application.

In another embodiment, a search may be expanded to include or exclude any related data or categories of data for the content that is searched. For example, a search may be made for content with the actor "Matt Damon" but within those results, exclude content that also contains any reference to "Ben Affleck."

Figure 5:
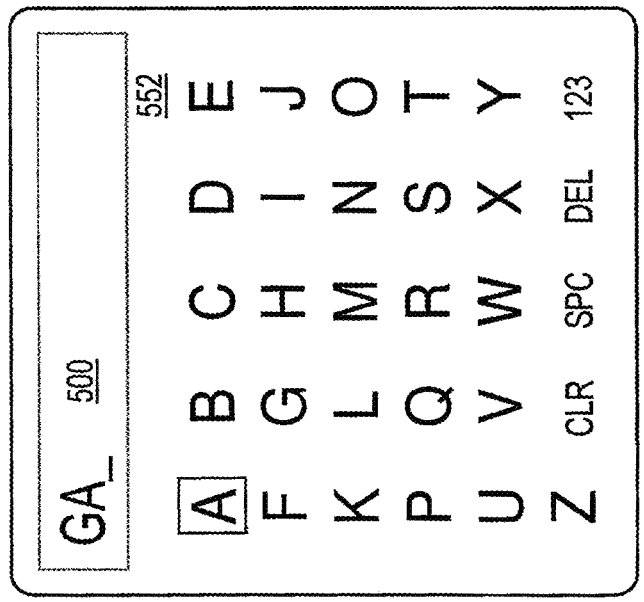
FIG. 5 illustrates an example of a DVR-presented screen that displays the results of a search performed on the progressive search screen, according to an embodiment of the invention.

In an embodiment, a user initiates the swivel search system by performing a search by program titles, people, or tags. To initiate the search for program titles, people, or tags, the user enters alphanumeric characters or symbols for the program title, person, or tag that the user wishes to query in search box 400. In an embodiment, as alphanumeric characters or symbols are entered in the search box, search results appear that conform to the alphanumeric characters or symbols entered, as shown in FIG. 5. For example, if the user enters the alphanumeric characters "G" and "A," 500 then the search application would return results that include the tag "GAMBLING," 502 and the actors "Tim Gamble" 504, and "Michael Gambon" 506. As more alphanumeric characters are entered, the results of the search are correspondingly narrowed. For example, the alphanumeric characters "M", "B," and "L" might be added to the alphanumeric characters "GA" that were entered previously. This makes the search query term "GAMBL." Under this circumstance, the tag "GAMBLING" remains, as does the actor "Tim Gamble." However, the actor "Michael Gambon" would be removed because the actor's last name, "Gambon" does not contain the search query alphanumeric characters "GAMBL."

In an embodiment, the results displayed do not begin with the alphanumeric characters that are entered by the user, but merely contain the alphanumeric characters. For example, if a user enters the alphanumeric characters "ERI", then in addition to the result "ERIN BROCKOVICH", that begins with "ERI," other results that merely contain the alphanumeric characters "ERI" would also appear. For example, another search result might be "AMERICAN IDOL."

In another embodiment, rather than displaying search results that conform to all of the possible categories (people, program, and tags), a user selects a particular category in which to display possible results. For example, a user might limit search results to only people. Thus, when search results that conform to the alphanumeric characters of the search query that are entered by the user are displayed, the results that appear conform to the category "people" and to the alphanumeric characters entered for the search query. In other embodiments, multiple categories ("people" and "program titles") may be selected by the user for display.

In yet another embodiment, the search may be limited to exact matches. Under this circumstance, no search results that conform to the search query are shown as the search query is entered. Rather, once the user has entered the alphanumeric characters for the entire query, the user selects a submit button, or any other such signal to indicate that the search term is to be submitted, and results that conform to the search query are then shown. This may speed searches as results are not updated upon the entry of each alphanumeric character of the search.

In an embodiment, if a particular tag is selected, then programming content or other searchable terms that relate to the particular tag are returned as results. For example, if the tag "GAMBLING" 502 is selected, then programming content or other searchable terms that relate to the tag "GAMBLING" 502 are returned as results. The results are shown in FIG. 6 as element 600. Among the results 600 are the movies "Casino Royale" 602 and "Rounders" 604 that are shown in the list of related content on the left area of the screen. Other results may appear that are not strictly content. For example, an actor might appear that is well-known for appearing in movies related to gambling such as "George Clooney." In another example, other tags might appear that relate to the tag "Gambling" such as "Poker," "Blackjack," or "Las Vegas." In yet another embodiment, downloads might appear that relate to the tag "Gambling" such as a downloadable game in which the user plays casino games.

In an embodiment, as the cursor is placed by a user over a particular programming content, then information and terms about the content may be shown on the column at the right area of the screen. This is shown in FIG. 6 as the cursor is placed over the content movie "Casino Royale." The right area of the screen displays information and terms about the movie "Casino Royale" 606.

In an embodiment, the user interface is a two column format in which a selection may be highlighted on the left column, and then options or terms that appear based upon that selection appear on the right column. As used herein, the right column or right area of the screen may be referred to as the "flyout" area. This occurs because a selection is made and options "fly out" to the right in the "flyout" area. However, any term may be used that unambiguously describes the right area of the screen. For example, when the cursor is over "Casino Royale," on the left column, then information about the movie "Casino Royale" 606 is shown on the right column, or "flyout" area. The structure of the user interface may vary from implementation to implementation. For example, as data related to the content might be displayed in the left column and content related to the selected data might be displayed in the right column.

In FIG. 6, the information that appears in the right column about the content "Casino Royale" is a short synopsis of the plot 608 and the primary actors 610. In an embodiment, additional options or actions may be provided by the service rather than just related information. For example, in FIG. 6, an option to "See more information" 612 about the content is listed as well as an option to "Record this program" 614. Selecting the option "See more information" may bring up more detailed information than merely the short plot synopsis and primary actors. For example, a more complete list of the movie's credits, reviews of the movie, short media clips, trailers, downloads, or links to purchase the DVD and soundtrack might be included within the details screen.

In an embodiment, the options and actions provided vary based upon the data available to the service provider. For example, when "Record this program" is selected by the user, the DVR schedules the next available showing of the content for recording. A user may request that the DVR record a showing other than the next one available based upon other factors, such as a later showing being broadcast in high definition or with fewer or no commercial interruptions. In the case where the content is a series, the next episode that airs is scheduled to be recorded. The user may override that action and request that a different episode or high definition broadcast instead be recorded. In another embodiment, the user may have conflicts because other programs are set to be recorded at the same time that the user would like to record a second program. The user or the service provider may select another showing of the program to record in order to resolve the conflict.

According to an embodiment, if the cursor is moved to another programming content, then information, such as, but not limited to, the plot, and the primary actors for that particular programming content are shown. This is shown in FIG. 7. FIG. 7 illustrates this as the cursor within the swivel search is moved from "Casino Royale" 702 to "Rounders" 704. The information shown in the right column, or "flyout" area now displays information related to the movie "Rounders."

In an embodiment, when a programming content is selected or clicked by a user when with the cursor superimposed on the programming content, the cursor moves from the left column to one of the information terms in the right column. In another embodiment, the programming content may also be selected by pressing a right arrow key from the remote in order to direct the cursor to move to the informational terms in the right column. With the cursor now in the right column, any of the data terms related to the selected content may be selected. For example, in FIG. 8, the movie "Rounders" might be selected. Upon selection, the cursor moves from the left column 802 to the right column 804 of the screen that contains the programming or informational data related to the movie "Rounders." The programming data may include, but is not limited to, actors, character names, directors, writers, plot synopsis, or any other information about that particular programming content. The location of the programming data and the programming content on the screen may vary from implementation to implementation with content on the right column and programming and related informational data on the left column. The user may select any of the actors 806 to view programming content associated with that particular actor and "progress" or "swivel" to that information.

In an embodiment, when a user selects any of the program data or informational terms related to the content, content and terms that relate to the selected term appears. As shown in FIG. 9, if the actor, Matt Damon, is selected, then data and terms that relate to the actor is shown. This related data may include, but is not limited to, a snapshot of the actor 902, his biography 904, and other content 906 that the actor appeared. This is shown on the left column within FIG. 9. Related data may also include character names of his roles, a short video clip of the actor, or playing any other type of media that features the actor. Any of the content displayed may be selected to "progress" or "swivel" to that content, and more selections may be subsequently made.

3.2 Entering Swivel Search from Viewed Content

Figure 10:
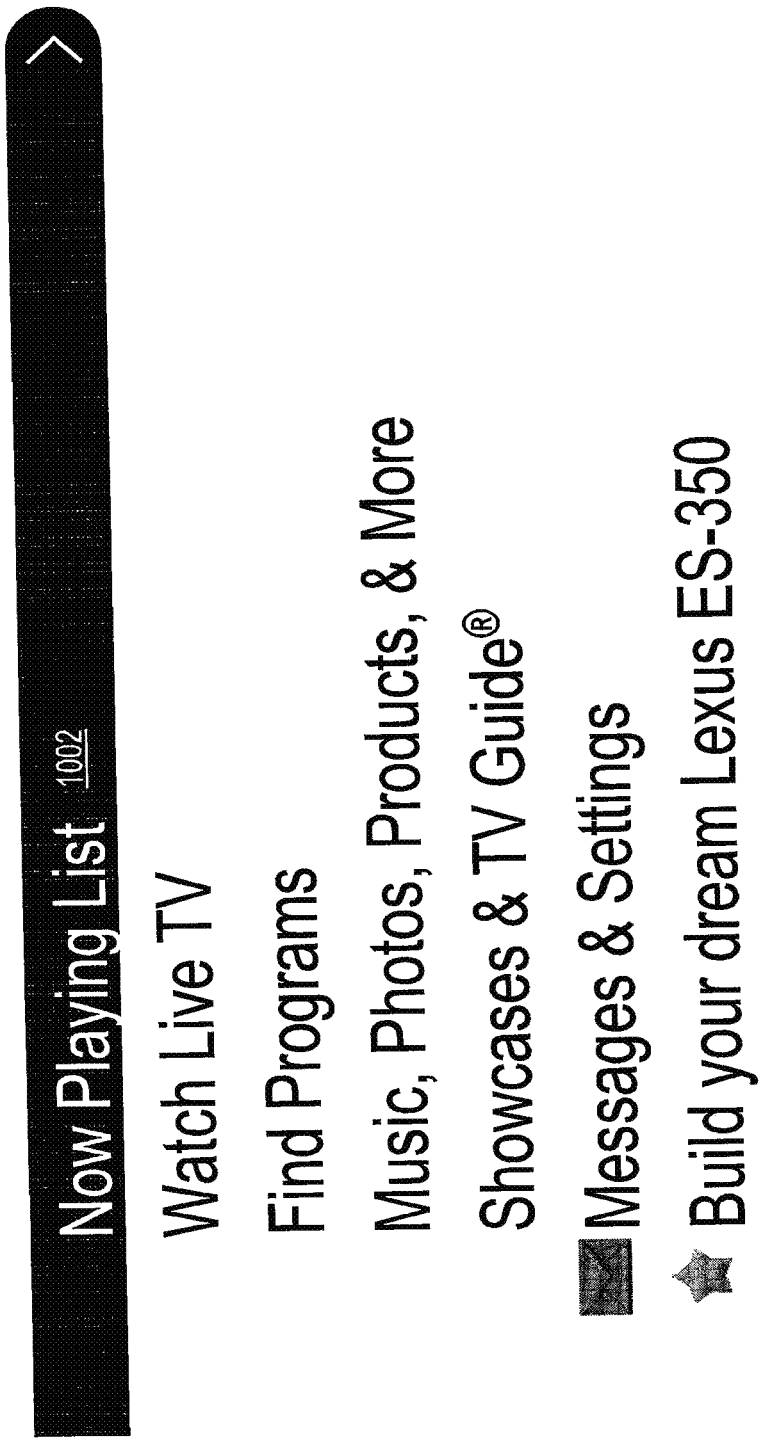
FIG. 10 illustrates an example of a DVR-presented main menu that displays a menu item whose selection initiates a process to view previously recorded content on the DVR, according to an embodiment of the invention.

In an embodiment, swivel search may be initiated as the user is watching previously recorded content. In order to begin watching previously recorded content, the user would select the "Now Playing List" 1002 from the initial menu as shown in FIG. 10. Selecting the "Now Playing List" takes the user to the screen as shown in FIG. 11. The "Now Playing List" displays content 1102 that has been previously recorded or downloaded and is now available to be viewed by the user. In this example, the user selects "How I Met Your Mother" 1104.

Entering swivel search while watching previously recorded content allows the user to enter the swivel search system using the recorded content as the initial point of the search. For example, if a user were watching the recorded television show "How I Met Your Mother", and entered the swivel search system, then "How I Met Your Mother," would be treated as the first selected term of the search. In another embodiment, the program data swivel search system is initiated as the user is watching live television content. Similar to viewing recorded content, the initial point of the search would be the content that is being viewed by the user. For example, if a user is watching the television show "ER", and entered the swivel search system, then "ER," would be treated as the first selected term of the search. In another embodiment, the user enters swivel search based upon previously downloaded content. In yet another embodiment, the user enters swivel search based on content suggested by friends. Any content that may be selected by a user may be used as a starting point to enter swivel search.

The process is shown beginning in FIG. 12. The user initiates the information screen of the television show, "How I Met Your Mother." The title of the show 1202 and a short synopsis of the plot 1204 appear. This screen also contains recording options 1206 and information about the recording 1208.

Figure 13:
FIG. 13 illustrates an example of a DVR-presented screen that displays more options that may be selected for a particular program when that particular program is being viewed, according to an embodiment of the invention.

As shown in FIG. 13, "More options" 1302 allows for a selection of "swivel search" 1304. This is used to enter the swivel search system. The label of the selection may vary from implementation to implementation in order to enter swivel search. In another embodiment, a selection for "swivel search" appears on the informational screen of the television program, bypassing the need to enter the "More options" screen. Once the selection is made to enter swivel search, a screen appears as shown in FIG. 14, in which to select program data and other options that relate to the television program.

Entering swivel search while viewing a particular content pre-populates the swivel search system with that particular content. The user does not need to enter the program title as he or she did by entering the swivel search system from a search screen. In an embodiment, credits such as the primary actors and guest stars as well as upcoming showings and available downloads of the show are shown. Other credits or programming options may be implemented as well and this embodiment is not limited to only those credits or programming options displayed. The credits 1402 and programming options 1404 may be seen on the left column in FIG. 14. The results are displayed on the right column 1406 when the cursor is placed over a particular option. The placement and display of programming data and options and results may vary from implementation to implementation.

3.3 Options in Swivel Search

When "Upcoming showings" 1502 is selected as shown in FIG. 15, the future airings of the television show 1504 are shown according to the schedule made available by a content provider or a third party organization that aggregates such data. In an embodiment, the upcoming showings are limited to what is being aired within the next fourteen days. In another embodiment, upcoming showings are limited to a different time period. In yet another embodiment, the upcoming showings are not limited to any specified time period. In an embodiment, the time period may be specified by the user. In another embodiment, the time period may be specified by the service provider. In this instance, if content selected is not scheduled to be shown, then a "wishlist" is made of that selected content. As used herein, the term "wishlist" refers to the process whereby a selection of a particular content by the user is stored and the selection is recorded should that particular content be shown at a future, as yet undetermined date, or that particular content later becomes available by download.

In an embodiment, content that the user may select includes broadband video and other content that is downloadable. Thus podcasts, videos from websites on the Internet, and other content from the Internet may be included as content from which the user may select. Thus, the content is not limited to traditional broadcast television sources such as cable or satellite. If "Available Downloads" 1602 is selected as shown in FIG. 16, then available downloads 1604 of the show are shown in the right column. Any specific placements of content and selected options may vary from implementation to implementation.

In another embodiment, "Available downloads" are included with the results of content that may be recorded. For example, the future airings of the show may be displayed alongside episodes of the show that might also be downloaded. Thus, separate screens, one screen for airings that may be recorded and another screen for downloads, are no longer required. In an embodiment, selections that may be recorded are distinguished from selections that may be downloaded by a graphical indicator located in a proximity to the selection. A graphical indicator may be displayed for each selection that may be recorded and a graphical indicator may be displayed for each selection that may be downloaded. In another embodiment, only selections that may be recorded have a graphical indicator. In yet another embodiment, only selections that may be downloaded have a graphical indicator. The graphical indicator that indicates whether a selection may be downloaded might be a network symbol or any other type of symbol that may be used to indicate a download. The graphical indicator that indicates whether a selection may be recorded might be a recording symbol or any other type of symbol that may be used to indicate a recording. The actual graphical indicators used may vary from implementation to implementation.

In an embodiment, any of the available downloads 1604 may be selected and purchased by the user. In an embodiment, before the purchase is completed, there may be a purchase confirmation screen or box in order to confirm that the user does wish to purchase the content. The purchase screen or box may include, but is not limited to, the purchase price of the download, the length of time to download the content, and a scheduler should the user want to download the content at a later time. The download of the show may commence over a broadband connection for later viewing. In an embodiment, an alert informs the user that the download has been completed. In another embodiment, the selected available download is sent to the DVR by way of cable, over-the-air, satellite, infrared or any other known means of transmission. Downloadable content is made available by the service provider, the content provider, or third party partners that make available downloadable content.

In an embodiment, authorization to complete a purchase is required. Authorization may be performed using a variety of methods. For example, a password might be required in order to proceed with the purchase. Other techniques may be used to authorize the purchase and to authenticate the user. For example, other techniques may include, but are not limited to, voice authorization, finger scanning, entering a security code or any other technique where a user is authenticated so that a purchase may be authorized.

In another embodiment, a selection to download a particular content may not be available by one of the partners or the service provider, and instead, the content is searched for on other client DVRs within the network of the service provider. This may also be called peer-to-peer downloading. Peer-to-peer downloading is another option that may be performed prior to placing the content on the wishlist of the user. Each DVRs owner may elect to opt-in or not opt-in in order to allow other DVR owners to search and download content from his DVR. Other considerations may be determined about whether a DVR may participate in peer to peer downloading. For example, the service provider might only allow DVRs to participate if the DVR has a broadband connection and has a connection speed above a particular threshold. Other considerations may limit downloads to DVRs that are located in a particular service or geographic area or that subscribe to a particular premium service.

In an embodiment, once a particular content is determined to be unavailable, either through broadcast or downloading, the service provider searches other DVRs for the particular content. In an embodiment, if the particular content is found on other DVRs, the service provider provides a list of DVRs on which the particular content may be downloaded. The user who wishes to download the content may then select which DVR he or she wishes to download the content. In another embodiment, if the particular content is found on other DVRs, the service provider initiates a download from the DVR that stores the content to the DVR of the user who whishes to watch the content. In an embodiment, DVRs share authentication information prior to the start of any download.

As shown in FIG. 17, another option that may be selected in the swivel search system is "If You Like This" 1702. In an embodiment, should "If You Like This" be selected, then content similar to the current program selected are displayed. For "How I Met Your Mother", six other television series 1704 appear on the right column that are determined to be similar. "Friends" 1706 and "My Name is Earl" 1708 are an example of two of these shows. In an embodiment, the shows that are similar are based on aggregate viewing data from users. Data is aggregated by the service provider from users watching a particular show. If there is a correlation to between viewing the particular show and another television show, then the second television show is included as similar shows. In another embodiment, similar shows may be based upon editorial content provided from the service provider, the content provider, or some other third party. Any other criteria may be used in order to relate a show or content to another show or content. These may include, but are not limited to, whether the show is categorized in a particular genre, the time period of the show, or the general subject of the show.

In an embodiment, the director of a show may also be selected like any other credit, or program data. As shown in FIG. 18, the director, David E. Kelly 1802, is selected. Similar to how content related to the data is shown for actors, content 1804 is shown for the director. In this example, other shows directed by David E. Kelly are shown on the right column. "Boston Legal" 1806 and "Chicago Hope" 1808 are two of these shows. Selections may be made of these shows and then the user would "progress" or "swivel" to the information about that selected show. From there, the user may "progress" or "swivel" to other related shows or programming data.

3.3.1 Tags

Tags 1902 are also shown as an option that may be selected in the program data swivel search system as shown in FIG. 19 on the left column. For the television series "Doogie Howser, M.D.", the tags "coming of age," 1904 "doctor," 1906 "medical," 1908 and "prodigy" 1910 are shown. When a tag is selected, content 1912 related to that tag appear in the right column. In this example, for the tag "doctor" 1906, the television series "ER" 1914, "Grey's Anatomy" 1916 and "Scrubs" 1918 appear because these shows relate to the tag and are scheduled to be shown in the near future.

Tags, as used herein, refer to a set of words, pictures or other media used to link various pieces of content together. Examples of tags may be, but are not limited to, locations in which the content is set, genres to which the content belongs, or the subject matter associated with the content. If the term "New York" is searched, results returned may include the television series "Friends", and the movies "Gangs of New York" and "Ghostbusters". The results are returned because each selection is set in the city of New York. In another example, the term "marriage" is searched. This search returns content that are associated with "marriage". Some results may include the television series "Wedding Story," certain episodes of television series in which marriage occurs such as "Friends," and the movie "The Runaway Bride".

Tags linked to content may include any association with words. Some examples of tags are "singing," "reality TV," "fashion," "terrorist," "crime," and "roommate." Tags may be added or changed over time. Tags are also not limited to words, but may consist of a picture associated with content (an example is the symbol that identifies singing star, Prince), or other media such as sounds or music. For example, a selection of new age music may be associated with a show on spirituality and a selection of heavy metal music may be associated with a television show on skateboarding.

Tagging may be performed on either broadcast content or downloadable content. Broadcast content includes, but is not limited to, content from over-the-air antennas, satellite, and cable. Downloadable content includes, but is not limited to, broadband video, podcasts and other forms of audio, images, and RSS feeds.

In an embodiment, tags may be created by the service provider. For example, the service provider might wish to point out certain subject matter available in a television program. In this way, if a user repeatedly views a certain video segment that relates to a certain subject matter, then the service provides associations to other video segments that relate to the certain subject matter. The service provider may also provide tags that originate from the content provider.

In another embodiment, the content provider creates tags for the content provider's own programming. In this circumstance, the tags are not provided first to the service provider for dissemination for additional editorial. This allows the content provider to have the assurance that tags provided to users are accurate and reflect the intention of the content provider. The tags may then be used by the content provider to ensure that users may be linked to other shows that contain similar content or appeal to a similar demographic of users.

According to another embodiment, multimedia devices such as DVRs, PCs and handheld computing devices are used to create tags for video programs, herein referred to as "community tagging." Using a control interface such as a remote control or a keyboard, when a user is viewing a video program, the user enters possible terms that associate the content to the tag. For example, the user might use the control interface to mark a program segment, or alternatively to mark an event within the video program. For instance, when viewing a sporting event such as a football game, the user signals via remote control when an exciting play occurs. The user may enter the term "exciting" and the tag is then associated with that program. Community tagging may be completely open or subject to the editorial of the service provider in order to maintain order. Also, community tagging may be aggregated so that only the most common actions are selected and then the tags may be disseminated to the network of users.

In an embodiment, data that may be selected is not limited to words used in credits and tags, but may include other media such as video, pictures, or sounds. Examples of pictures include, but are not limited to, headshots of actors, movie posters, or still frames from shows or movies. Sounds may include, but are not limited to, theme music from a show, music from a motion picture, or an actor's voice.

3.4 Privacy in Swivel Search

In an embodiment, privacy is maintained for the user by letting the user select whether information that he or she enters is saved and recorded by the service provider. If a user elects to have all information recorded by the service provider, then all functionality of the swivel search is available to the user. If a user selects to not opt-in for privacy, then the user may continue to use swivel search but not all functionality may be available. For example, particular information might be needed to be saved in order to provide a swivel search feature. Under this circumstance, the swivel search feature that needs saved data would not be available to the user who does not opt-in. A user may elect to opt-in to certain information that allows access to some features of swivel search but not allow access to other features of swivel search.

Figure 20:
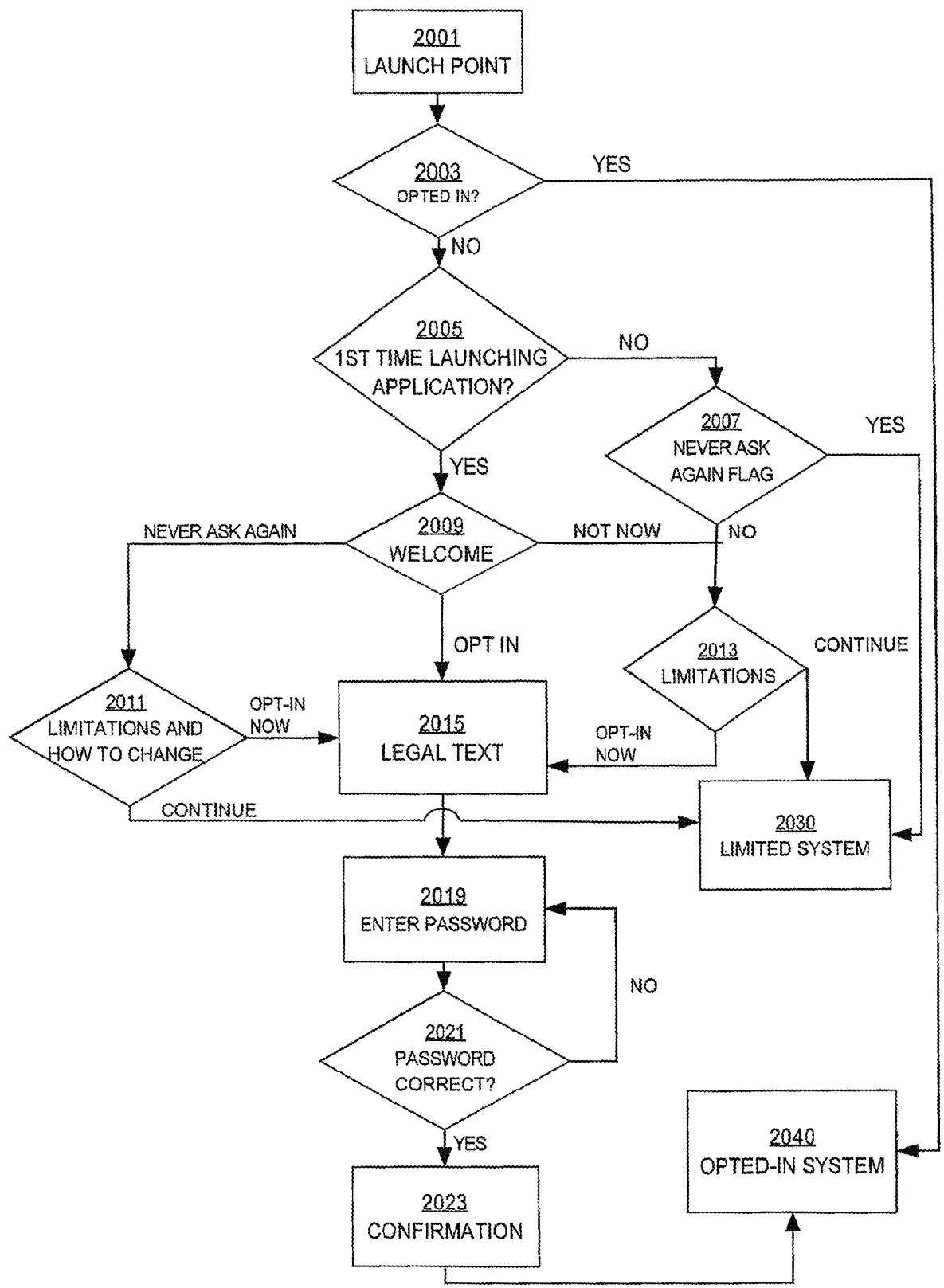
FIG. 20 illustrates a flowchart of the opt-in process for privacy for progressive search, according to an embodiment of the invention.

A flowchart for privacy selection according to an embodiment is shown in FIG. 20. A user enters the swivel search system at a launch point in step 2001. The system determines whether the user is already opted into the privacy policy in step 2003. If the user has already elected to opt-in, then the system allows the user to access the swivel search system with full functionality, or the opted-in system of 2040. For example, the user may wish to limit his search based upon "channels you receive." Channel reception information is considered private information and thus the user must opt-in in order to allow the search application to process with full functionality.

If the user has not already elected to opt-in, then the system determines whether it is the user's first time to launch the application as seen in 2005. If this is the user's first time launching the application, then the system displays a welcome screen as shown in step 2009. On the welcome screen, the user may elect to 1) opt-in, 2) not answer the question at this time, or 3) never ask again. If the user selects "never ask again," then the user is presented with a screen that states that the system has limited functionality at step 2011. At step 2011, the user may select to continue onto the system with limited functionality or to opt-in to the privacy policy. If the user elects to continue, then the user is placed in the swivel search system without full functionality, or the limited system of 2030 and a "never ask again" flag is attached to the user. The "never ask again" flag alerts the system to not query the user to opt-in to provide private information. If the user elects to opt-in, the user is taken to a screen with legal text 2015 explaining the user's choice and to confirm their election to opt-in. Otherwise, the user may navigate back to the previous screen.

If the user elects to opt-in from the welcome screen, then the system navigates the user to a confirmation screen with legal text 2015. At the confirmation screen, the user still has the ability to not accept to opt-in to provide private information. If the user selects "not now," then the system navigates the user to a screen describing the limitations of not opting in and given the choice to continue or opt-in as shown in step 2013. If the user elects to opt-in, the user is taken to the confirmation screen with legal text 2015 where they either confirm their choice to opt-in or may go back to the previous screen. If the user selects continue, then the system navigates the user to the swivel search system with limited functionality 2030. If the user elects to opt-in on the confirmation screen, then the user enters a password in step 2019. If the password is correct as shown in step 2021, then the opt-in is confirmed 2023 and then the swivel search system is launched with no limitations 2040.

If this is not the first time that the user is launching the swivel search system as shown in step 2005, then the system determines whether the "never ask again" flag is associated with the user in step 2007. If the flag is not present, then the system displays a limitations screen that describes the limitations of the search system when not opting in as shown in step 2013. If the "never ask again" flag is present, then the system navigates the user to the search system with limited functionality in step 2030.

In the legal text screen as shown in step 2015, options may be placed to indicate what particular information the user wishes to share with the swivel search system. In an embodiment, options may include, but are not limited to, the "channels received." The options of the particular information to include may vary based upon the geographical location of the user, the equipment that is being used, or the methods in which the user communicates with the service provider (broadband vs. phone).

In an embodiment, the user enters the privacy selection flowchart with the legal text screen in step 2015 while the user is using the swivel search system. This situation occurs if the user has already entered the swivel search system and attempts to retrieve data that is not allowed because the user has failed to opt-in to the necessary privacy selections.

3.5 Additional Features in Swivel Search

In an embodiment, the swivel search system may be initiated from a program details screen for content that is scheduled to be broadcast in the future. For example, a search is performed while the user has not selected to use the swivel search system. The result of the search is a program that has not yet been broadcast. Under this circumstance, when the user selects the information screen of the program that has not yet been broadcast, a selectable option in the information screen, or on a screen that may be navigated from the information screen, allows the user to enter the swivel search system with the content to be broadcast in the future as the selected content. In an embodiment, the swivel search system may be initiated from content that is downloaded. Thus, the swivel search system may be initiated when viewing recorded content, live content, downloaded content, and also when viewing information on content that is scheduled to be broadcast in the future.

In an embodiment, users are allowed to add ratings to any and all content and related terms and data in the swivel search system. For example, ratings may be added for downloaded content as thumbs up if the user likes the content, or thumbs down if the user does not like the content. Users may enter the ratings using the remote interface device of the client DVR. Other users may view the ratings submitted by an aggregation of other users, or select a particular user, and make content choices partially based upon those ratings.

In another embodiment, users may rate any program data within swivel search. Users may rate the associations of data themselves or any other relation within swivel search. This allows the service provider to improve the quality of relationships and remove associations that are poorly rated. In addition, users may rate tags or any other term associated with content. Users may also rate the ratings submitted by other users.

In another embodiment, ratings are determined based upon collaborative data. The ratings may be for any content. In this circumstance, content that is viewed is aggregated across a cross section of total viewership in order to determine associations between content, including content from satellite, cable, or downloading.

In an embodiment, a user may select bookmarking a particular show. The use of bookmarks allows a user to reference a particular show or particular point in a particular show for later retrieval. Further details for bookmarking may be found in U.S. Pat. No. 6,868,225 B1 that is owned by the Assignee, and is incorporated by reference for all purposes herein.

In an embodiment, a user may find a particular show of interest in swivel search and send information about the show to a friend. Sending information to a friend or bookmarking may be an additional action that may be accomplished by a user, in addition to recording and downloading a particular show. The user may send this information to the friend by a variety of methods such as email, a message, or an instant message via a chat protocol. More details about sending information via instant messaging may be found in U.S. patent application Ser. No. 10/168,782 that is owned by Assignee and is incorporated by reference for all purposes herein. In another embodiment, a user may record a particular show and wish to share the particular show to a friend. The user may upload the show to the friend's DVR unit or may transfer the show using any type of network. Further information regarding sharing personal media may be found in U.S. patent application Ser. No. 10/742,581, that is owned by Assignee, and is incorporated by reference for all purposes herein.

In an embodiment, the user interface is enhanced to include advertisements or other promotions that may be related to the search of content made by the user. The advertisements or promotions may be initiated by the service provider, the content provider, or a third party who wishes to offer users related goods or services related to the content or search that the user performs.

In an embodiment, the swivel search system user interface is enhanced to use the features available with high definition television. For example, the interface may have expanded information because more screen space is available for the interface. In addition, the program data multimedia features may be enhanced to take advantage of the increased clarity of the pictures and thus more high quality pictures, graphics, and media are presented to the user. Other features and media may also be enhanced to take advantage of the high definition screen, such as an additional column, to make the user interface a three-column format.

In an embodiment, the swivel search system user interface is able to be used on any type of client, such as a website, set-top box, cell phone, handheld device, laptop, PC, etc. In addition to being able to perform any swivel search on a client DVR, the swivel search system is accessible on a website that users employ to perform recordings and obtain content. In this implementation, users may also rate the content and view any content that is available on the website. This may include downloaded content or content on the client DVR that may be uploaded and displayed on the client.

3.6 Unified Searching of Broadband and Broadcast Multimedia Content

According to one embodiment, an advanced DVR (e.g., DVR 102) allows a user to search for multimedia material across both broadcast and broadband sources. The user forms search criteria (by direct input or selecting a menu item) and instructs the DVR to perform the requested search. The user typically does not have to be concerned about whether the search is for broadcast content or whether the search is for broadband content. The embodiment automatically performs a plurality of searches across dissimilar sources using the user's search criteria. Once the user is presented with a listing of available broadcast and broadband content that matches his search, the user can peruse the list of available content in order to obtain more information for particular content or to schedule recordings or downloads of particular content. The ability to search both broadcast and broadband sources for multimedia content is unique to the embodiment.

Figure 21:
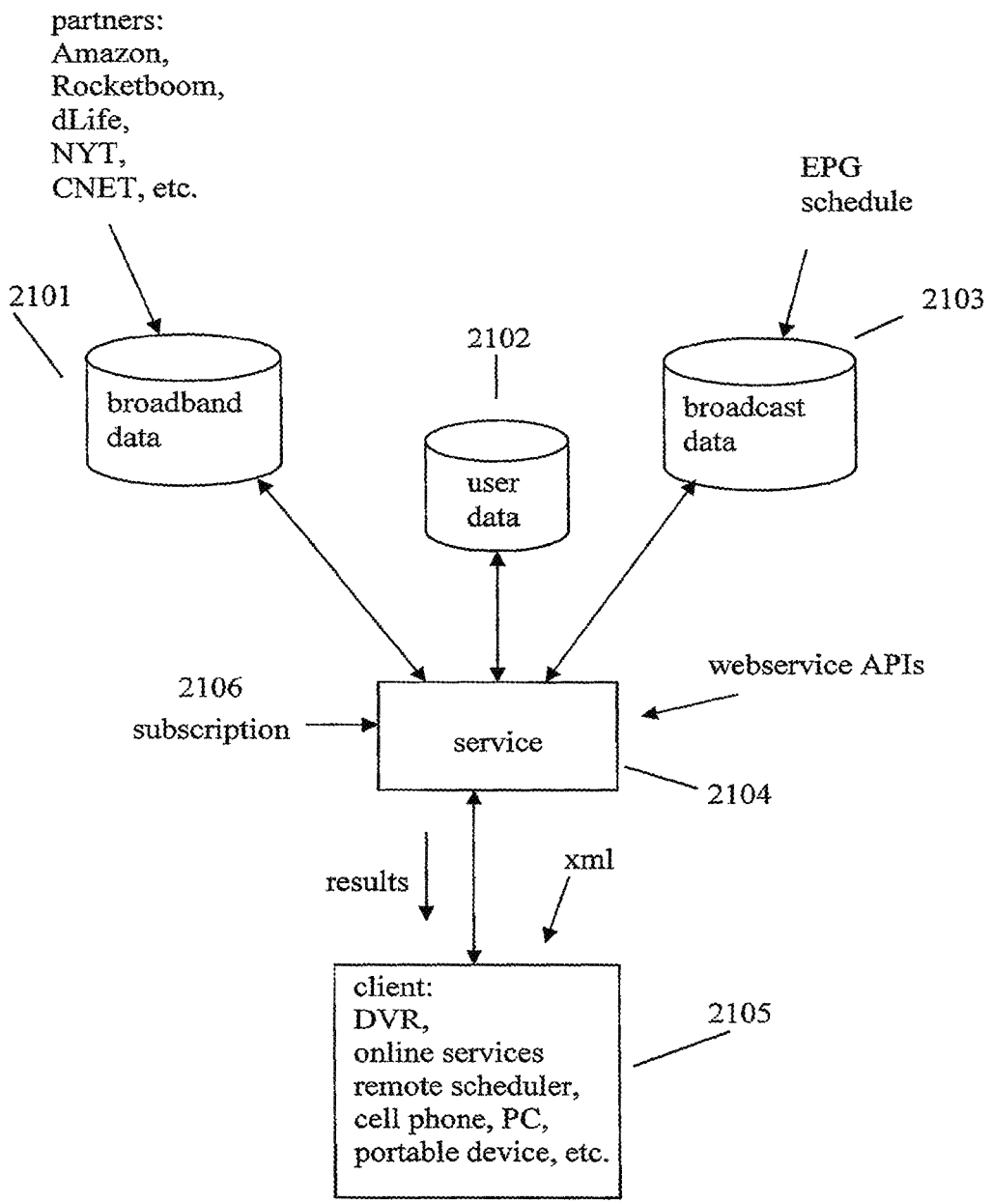
FIG. 21 is a block diagram illustrating an example of a service communicating with broadband and broadcast databases according to an embodiment of the invention.

FIG. 21 illustrates a service 2104 that receives search requests from client systems and performs an integrated search across databases containing informational data for broadcast content and broadband content using the received search criteria. The structures presented in FIG. 21 may also be employed to implement swivel search. The service 2104 can be a server implementing searches across databases 2101 and 2103. The service 2104 can also consist of a plurality of Web Service Application Program Interfaces (APIs) that service client requests. The service 2104 may be owned or operated by a service provider, third party, etc. Owners of client devices such as client device 2105 are charged a fee by the service provider, third party, etc., for access to the database search service, content recording scheduling, content download service, etc. A user enters search criteria on a client device 2105. The client device 2105 can be a DVR, set-top box, cell phone, handheld device, laptop, PC, etc., for example.

The client device 2105 formulates a search request given the user's input. FIG. 5 illustrates a screen shot of an entry screen 550 where the user enters information such as a keyword, actor name, director name, producer name, program title, etc. As the user enters each character on the virtual keypad 552 in the search, the client device 2105 displays the entered characters in an entry field 500. The client device 2105 formulates a search request using the entered characters. The client device 2104 sends the search request to the service 2104.

The service 2104 receives the search request from the client device 2105. The service 2104 formulates a query for each database 2101, 2103. The databases consist of at least one broadband database 2101 and at least one broadcast database 2103. The broadband database 2101 contains data from partners of the service provider such as: Amazon.com, RocketBoom, dLife®, The New York Times®, and CNET®. Broadband databases may exist at each partner's server. The service 2104 then queries each partner's database with a compatible query that the service 2104 creates using information regarding the type of database queries each partner's database requires. In an embodiment, the partners pay the service provider a fee for placing data in the database or for having their database searched by the service 2104. For example, partners may pay a fixed fee or a fee based on the number of times that the service 2104 queries the partner's database. The broadband database(s) makes it possible for the partners' products and services to be displayed to users. Data in the broadband database(s) consists of links to multimedia content that are available for download from the partners. The data also includes information describing the multimedia content such as: program description, program synopsis, program rating, actors, directors, producers, program title, pricing, etc., as well as search data tags (described below).

The broadcast database 2103 contains data from electronic program guide (EPG) providers such as Tribune Media Services®. The EPG data describes programs that are available from many different broadcasters and services such as: DirecTV®, Comcast®, Cable Vision®, etc. The EPG data contains information describing the program such as the channel that the program is available on, program description, program synopsis, program rating, actors, directors, producers, program title, etc., as well as search data tags (described below). EPG data is typically updated periodically and typically covers 14 days of programming. The number of days is dependent upon the service provider. The EPG data covers, for example, the U.S., Mexico, Canada, and other countries. Given that the EPG data is on the service provider's database 2103, the service provider can retain all the EPG data that EPG providers have delivered. This gives the service provider historical data from which a user can obtain historical data or program names. The service can provide a client device with information from the historical EPG data regarding multimedia content such as when the content was last broadcast. This type of information is typically not obtainable in normal DVRs or EPG services because EPG data is typically limited to a number of days, such as 14 days. Search requests for content that is not in a typical 14-day EPG would receive a null search response. In this embodiment, since the service has the historical EPG data, the search requests would receive a positive hit as long as the content has been shown in the time frame of the service's EPG data.

The service 2104 performs searches on both databases 2101, 2103 using the search queries that it created. The databases 2101, 2103 can be databases that the service 2104 can directly access or database servers hosting the databases or other database services. The service 2104 receives or generates results from the search queries and organizes the retrieved information into a format that the client device 2105 can use.

In an embodiment, the service 2104 also has access to its own client device database (not shown) where the service 2104 stores information regarding the status of all the client devices in communication with the service 2104. The client database includes, among other information, the multimedia content that the client devices have recorded. The service 2104 can include in the search results that concern broadband content, multimedia content that is available to download from other client devices as described in U.S. patent application Ser. No. 11/285,411 which is owned by the Applicants and is hereby incorporated by reference. A client device can request downloads of multimedia content from multiple client devices and receive segments of the multimedia content from those client devices. This allows a user to obtain multimedia content that has not been broadcast for a long time period and is not scheduled to be broadcast as well as not being available from partners.

The client device 2105 receives the search results from the service 2104. The client device 2105 processes the search results and displays the search results in a list 554 to the user. The list 554 begins with the first multimedia content that matches the characters in the entry field 401 that the user has entered. The list can be updated at each character entry or after a few seconds of inactivity from the user. The user may pause while entering characters to allow the list to be refreshed. The client device 2105 creates the search request to the service 2104 upon each character entry or few seconds of inactivity. This gives the user a dynamic list that reacts to the user's input in a rapid manner.

The user can also access the search mechanism through a program information screen that the user displays for a particular content that is on an EPG or has been recorded. FIG. 13 shows a screen 1300 that is displayed for a recorded program. The screen 1300 allows the user to navigate through menu options and select the search option 1304.

When the user selects a multimedia content from the list 554 or the search option 1304, the client device 2105 displays a screen as in FIG. 14. The screen 1400 displays information related to the selected multimedia content. Information contained in the data sent from the service 2104 is used to display program information such as the program synopsis 1410. The received data also may contain additional search terms 1402 that allow the user to select more search terms that are related to the multimedia content. The data may also contain search request information regarding upcoming showings for the multimedia content 1404 or available downloads for the multimedia content 1420.

If the user selects upcoming showings for the multimedia content 1404, the client device 2105 sends a search request to the service 2104 that requests information regarding upcoming showings for the multimedia content. The service 2104 queries the broadcast database 2103 for the upcoming showings for the multimedia content and sends the resulting data to the client device 2105. FIG. 15 illustrates a screen 1500 displaying upcoming broadcast showings for the multimedia content using data received from the service 2104. The client device 2105 receives EPG data relevant to channels the user receives, subscribes to, or the channels that are available in the area that the client device is in.

In one embodiment, the service 2104 receives subscriber information 2106 and looks up user data from a user data database 2102 in order to supply the client device with the correct information regarding multimedia content that is available to the specific user via broadcast or broadband access. The service 2104 can use the user's information to formulate search queries from the broadband database 2101 and broadcast database 2103 in order to find information that is appropriate for the user's location, age, preferences, etc. In one embodiment, the service 2104 can filter content information based on the user's age or client device's parental control setting (described in further detail below).

If the user selects available downloads for the multimedia content 1420, the client device 2105 sends a search request to the service 2104 that requests information regarding available downloads for the multimedia content. The service 2104 queries the broadband database 2101 for the available downloads for the multimedia content. As noted above, this operation could involve querying multiple partner databases. The service 2104 sends the received query data to the client device 2105. FIG. 16 illustrates a screen 1600 displaying available downloads for the multimedia content. In this example, some of the available downloads are for episodes of a program series that are available from a partner. The screen 1600 can display the list of available downloads 1604 with the partner's logo 1606 next to content titles available from that particular partner. The logo data can come from the broadband database 2101 or the service 2104. The user can select an episode from the list of available downloads 1604 to download the content to his client device 2105.

The download may originate from a partner and the user is presented with a screen that may display a synopsis of the episode and any costs associated with the download. The user may also select a download that is retrieved from other client devices as discussed above and as described in U.S. patent application Ser. No. 11/285,411. The service 2104 filters one or more client devices according to a number of factors, including bandwidth, to create a pool of client devices for transferring the content. The service 2104 initiates the transfer by either requesting each client device in the pool of client devices to begin transferring the content to the requesting client device 2105, or by directly requesting the client device 2105 to retrieve the content from the pool of client devices. The content is sent to the requesting client device in portions which are re-assembled at the client device 2105 and stored for later playback. It is not necessary for the user to know where the download is originating from and the user may or may not be told what mechanism is being used to download the episode.

FIG. 14 illustrates a screen 1400 displaying program information 1410 for the multimedia content. The screen 1400 also displays an option where the user can obtain more information about episodes (episode guide) of the multimedia content 1408. If the user selects the episode guide 1408, the client device 2105 sends a search request to the service 2104 that requests information regarding episode information for the multimedia content. The service 2104 queries the broadcast database 2103 and/or the broadband database 2101 for the episode information for the multimedia content. The service 2104 processes the received data and sends the processed data to the client device 2105.

FIG. 22 illustrates a screen 2200 displaying available episodes for specific seasons for a particular series title. In an embodiment, each time the user selects a season further in the list 2201, the client device 2105 sends a search request to the service 2104 that requests information regarding episode information for the selected season for the multimedia content. The service 2104 queries the broadcast database 2103 and/or the broadband database 2101 for the season episode information for the multimedia content. The service 2104 processes the received data and sends the processed data to the client device 2105. The client device 2105 displays the list of episodes to the user 2202.

FIG. 19 illustrates a screen 1900 displaying tags that are associated with the multimedia content or series title. The user can perform a search by clicking on any of the tag keywords or phrases 1902. The client device 2105 creates a search request using the selected tag. The service 2104 performs a search of tag information contained in the broadband database 2101 and/or the broadcast database 2103 in the same manner as searches described above.

In an embodiment, the service 2104 creates the user interface screen for the client device 2105 to display. Each time a client device sends a search request to the service 2104, the service formats the data received from the searches of the databases into a user interface screen that is presentable by the client device. The client device receives the user interface screen and displays the screen as formatted by the service 2104. The screen information instructs the client device on how it should respond to any key presses by the user. For example, the user moves the highlight bar down and the client device checks which items on the screen are selectable and moves the highlight bar to the next selectable item on the screen. If the user selects an item, then the client device looks at the screen information to see if the selection operation merits the highlight bar moving to another location or requires that a search request be sent to the service 2104. This allows the service to change the look and feel of user interface screens dynamically without having to update the client device's software to implement user interface changes. This approach is easily scalable and presents a highly maintainable model. Alternatively, the client device can format its own user interface screens when it receives screen information from the service 304.

3.7 Filtering Broadband and Broadcast Multimedia Content Search Results

The service 2104 has the ability to filter database query results according to user preferences, user personal information, client device settings, etc. As briefly discussed above, in an embodiment, the user can set preferences and personal information in his client device such as channels that he receives, channels that he views, age, sex, shows that the user likes and dislikes, the user's interests, credit card information, home address, etc.

When a client device 2105 sends a search request to the service 2104, the service 2104 creates queries to the broadcast database 2103 and/or the broadband database 2101. Upon receipt of the requested data, the service 2104 can filter the data to customize the data for the client device 2105. In one embodiment, the service 2104 can supply broadcast information to the client device 2105 that only pertains to the channels that the client device receives. In another embodiment, the service 2104 can supply the client device 2105 with broadcast information that only pertains to the channels that the user watches.

This type of filtering can be performed on an opt-in/opt-out basis. If a user opts-in, the user has given the service permission to use the user's preferences and personal information 2102, 2106, to automatically filter requested broadcast and/or broadband information to match the user's preferences and personal information.

If the user opts-out, then the service can only use information that it knows about the client device 2105 that does not involve the user's personal information. The service 2104 is limited to the client device's locale and channels that a client device would receive in that area from the local cable or satellite broadcaster.

The service 2104 can also filter information based on the type of client device. For example, if the client device 2105 is a portable video device, then the service 2104 may send a condensed version of the search results to the client device 2105.

In an embodiment, the user can specify to the client device 2105 that his selection of a search term is to be limited to a certain type of media or access. For example, the user can specify that the search be limited to HD content only. The user could also specify that the content listed be available from broadband only or broadcast only. The user can create any combination of such search limitations. Another embodiment would allow the user to specify combinations of tags that are displayed on a screen. Referring again to FIG. 19, for example, the user could specify combining the tags of Peter Riga 1920 and Prodigy 1910, or Prodigy 1910 and Coming of Age 1904, or any other combination of tags.

The user has the capability to select each tag using the highlight bar. Each time the user selects a tag, he can press a button on a remote control to signify that the selection is part of a combination. Once the user has selected all of his desired terms, he can press another button (or the same button) on the remote control that tells the client device 2105 that the search is to be performed. As an example, the user selects Prodigy 1910 and Coming of Age 1904 and also selects HD content only. The client device 2105 then formulates the search request and sends the request to the service 2104. The service 2104 creates queries across the databases that are appropriate for the search. Here, since the user has specified that the search be HD content only, the service 2104 queries the broadband database 2101, or partner servers as mentioned above, and the broadcast database 2103 for HD content that includes tags or other content information that match the search tags that were selected, i.e., Prodigy and Coming of Age. The service 2104 returns the query results to the client device 2105. The client device 2105 displays the search results to the user.

4.0 Implementation Mechanisms

Figure 23:
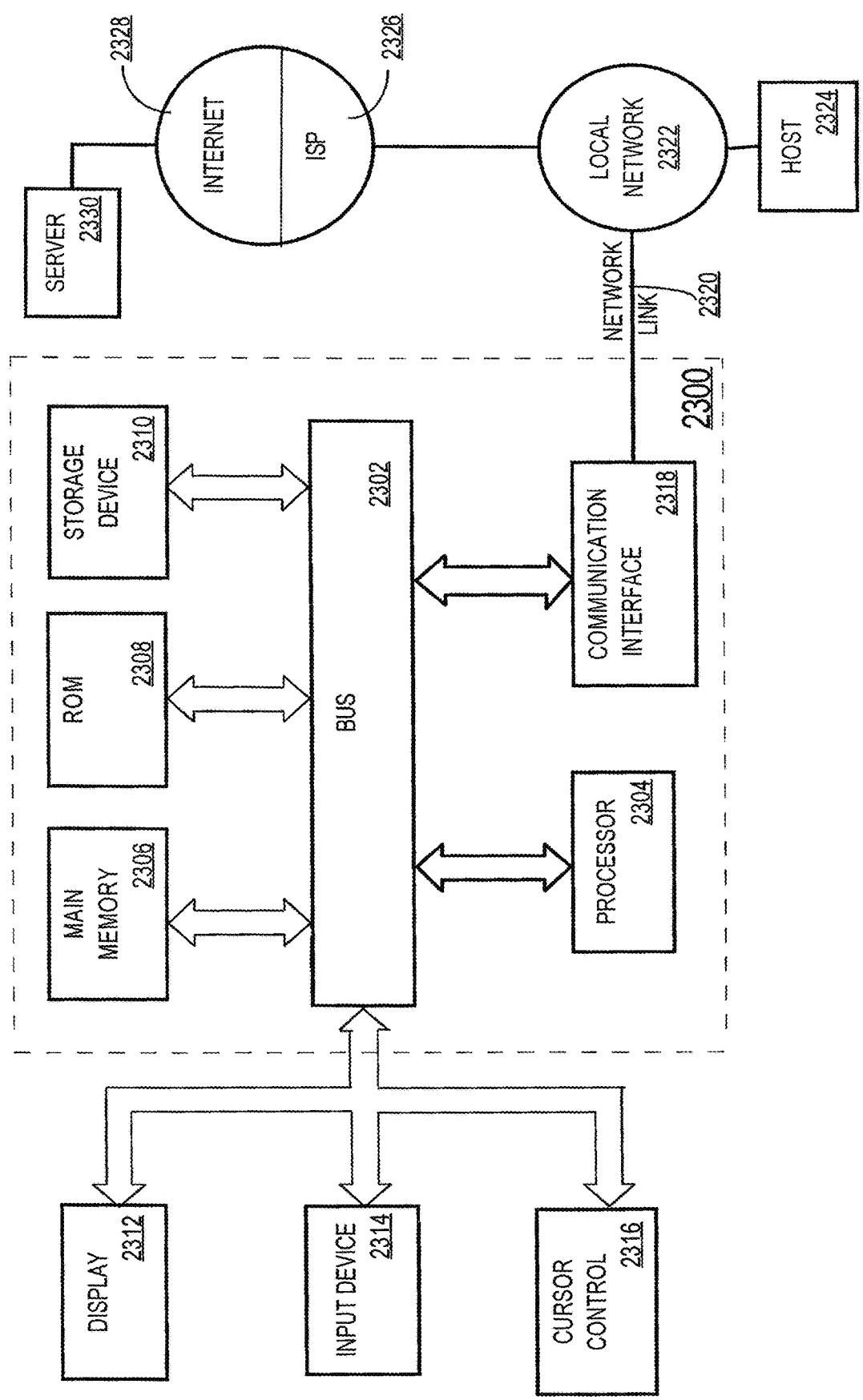
FIG. 23 is a block diagram of a system on which embodiments of the invention may be implemented.

FIG. 23 is a block diagram that illustrates a computer system 2300 upon which an embodiment of the invention may be implemented. Computer system 2300 includes a bus 2302 or other communication mechanism for communicating information, and a processor 2304 coupled with bus 2302 for processing information. Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

The invention is related to the use of computer system 2300 for implementing the techniques described herein. According to one embodiment of the invention, those techniques are performed by computer system 2300 in response to processor 2304 executing one or more sequences of one or more instructions contained in main memory 2306. Such instructions may be read into main memory 2306 from another machine-readable medium, such as storage device 2310. Execution of the sequences of instructions contained in main memory 2306 causes processor 2304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 2300, various machine-readable media are involved, for example, in providing instructions to processor 2304 for execution. Such a medium may take many forms, including but not limited to storage media and transmission media. Storage media includes both non-volatile media and volatile media. Non-volatile media includes, for example, optical or magnetic disks, such as storage device 2310. Volatile media includes dynamic memory, such as main memory 2306. Transmission media includes coaxial cables, copper wire and fiber optics, including the wires that comprise bus 2302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 2304 for execution. For example, the instructions may initially be carried on a magnetic disk of a remote computer. The remote computer can load the instructions into its dynamic memory and send the instructions over a telephone line using a modem. A modem local to computer system 2300 can receive the data on the telephone line and use an infra-red transmitter to convert the data to an infra-red signal. An infra-red detector can receive the data carried in the infra-red signal and appropriate circuitry can place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are exemplary forms of carrier waves transporting the information.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318.

The received code may be executed by processor 2304 as it is received, and/or stored in storage device 2310, or other non-volatile storage for later execution. In this manner, computer system 2300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
providing a user-controllable user interface privacy setting to indicate whether a data provider system is permitted to use a first subset of personal information of a user when identifying data items to be provided to a device of the user;
accessing a privacy policy indicating whether the data provider system is permitted to use a second subset of the personal information of the user when identifying data items to be provided to the device of the user;

based at least in part on receiving user interface input configuring the privacy setting to indicate that the data provider system is not permitted to use the first subset of the personal information of the user:
  using limited functionality of the data provider system to select, from a plurality of data items, at least one data item to be provided to the device of the user, wherein in selecting the at least one data item, the limited functionality does not utilize the first subset of the personal information of the user, and either utilizes or does not utilize the second subset of the personal information of the user based on the privacy policy; and
  providing the at least one data item to the device of the user; and
based at least in part on receiving user interface input configuring the privacy setting to indicate that the data provider system is permitted to use the first subset of the personal information of the user:
  using full functionality of the data provider system to select, from the plurality of data items, one or more data items to be provided to the device of the user, wherein in selecting the one or more data items, the full functionality utilizes the first subset of the personal information of the user, and either utilizes or does not utilize the second subset of the personal information of the user based on the privacy policy; and
  providing the one or more data items to the device of the user.

2. The method of claim 1, wherein:
the data provider system is in communication with at least one partner system; and
the first subset of the personal information of the user is provided by the partner system to the data provider system, based at least in part on the receiving of the user interface input configuring the privacy setting to indicate that the data provider system is permitted to use the first subset of the personal information of the user.

3. The method of claim 1, wherein in selecting the at least one data item, the limited functionality of the data provider system utilizes a particular selection criterion corresponding to a search term received via a user interface of the device of the user.

4. The method of claim 1, wherein in selecting the at least one data item, the limited functionality of the data provider system utilizes a particular selection criterion corresponding to selection of a category via a user interface of the device of the user.

5. The method of claim 1, wherein using the full functionality of the data provider system comprises:
selecting, from the plurality of data items, the one or more data items based on: (a) a selection of a category via a user interface of the device of the user and (b) the first subset of the personal information of the user.

6. The method of claim 1, wherein using the full functionality of the data provider system comprises:
selecting, from the plurality of data items, the one or more data items based on: (a) a search term received via a user interface of the device of the user and (b) the first subset of the personal information of the user.

7. The method of claim 1, further comprising:
determining a geographical location of the device of the user; and
based on the determined geographical location, determining whether to provide a user interface option to opt out of the privacy policy, wherein opting out of the privacy policy prevents the data provider system from using the second subset of the personal information of the user.

8. The method of claim 7, wherein the user-controllable user interface privacy setting is provided regardless of the determined geographical location.

9. The method of claim 1, wherein each of the limited functionality of the data provider system, and the full functionality of the data provider system, utilizes the second subset of the personal information of the user based on the privacy policy.

10. The method of claim 1, wherein the receiving the user interface input comprises determining whether an indication that indicates a consent to access the first subset of the personal information of the user has been received from the user prior to the selecting of the at least one data item or the one or more data items.

11. A system for applying privacy preferences of a user to a data provider system, the system comprising:
storage; and
processing circuitry configured to:
  provide a user-controllable user interface privacy setting to indicate whether a data provider system is permitted to use a first subset of personal information of a user when identifying data items to be provided to a device of the user;
  access a privacy policy indicating whether the data provider system is permitted to use a second subset of the personal information of the user when identifying data items to be provided to the device of the user;
  based at least in part on receiving user interface input configuring the privacy setting to indicate that the data provider system is not permitted to use the first subset of the personal information of the user:
    use limited functionality of the data provider system to select, from a plurality of data items, at least one data item to be provided to the device of the user, wherein in selecting the at least one data item, the limited functionality does not utilize the first subset of the personal information of the user, and either utilizes or does not utilize the second subset of the personal information of the user based on the privacy policy; and
    provide the at least one data item to the device of the user;
  and
  based at least in part on receiving user interface input configuring the privacy setting to indicate that the data provider system is permitted to use the first subset of the personal information of the user:
    use full functionality of the data provider system to select, from the plurality of data items, one or more data items to be provided to the device of the user, wherein in selecting the one or more data items, the full functionality utilizes the first subset of the personal information of the user, and either utilizes or does not utilize the second subset of the personal information of the user based on the privacy policy; and
  provide the one or more data items to the device of the user.

12. The system of claim 11, wherein:
the data provider system is in communication with at least one partner system; and
the first subset of the personal information of the user is provided by the partner system to the data provider system, based at least in part on the receiving of the user interface input configuring the privacy setting to indicate that the data provider system is permitted to use the first subset of the personal information of the user.

13. The system of claim 11, wherein the processing circuitry is further configured to, in selecting the at least one data item, cause the limited functionality of the data provider system to utilize a particular selection criterion corresponding to a search term received via a user interface of the device of the user.

14. The system of claim 11, wherein the processing circuitry is further configured to, in selecting the at least one data item, cause the limited functionality of the data provider system to utilize a particular selection criterion corresponding to selection of a category via a user interface of the device of the user.

15. The system of claim 11, wherein the processing circuitry is further configured to use the full functionality of the data provider system by:
selecting, from the plurality of data items, the one or more data items based on: (a) a selection of a category via a user interface of the device of the user and (b) the first subset of the personal information of the user.

16. The system of claim 11, wherein the processing circuitry is further configured to use the full functionality of the data provider system by:
selecting, from the plurality of data items, the one or more data items based on: (a) a search term received via a user interface of the device of the user and (b) the first subset of the personal information of the user.

17. The system of claim 11, wherein the processing circuitry is further configured to:
determine a geographical location of the device of the user; and
based on the determined geographical location, determine whether to provide a user interface option to opt out of the privacy policy, wherein opting out of the privacy policy prevents the data provider system from using the second subset of the personal information of the user.

18. The system of claim 17, wherein the user-controllable user interface privacy setting is provided regardless of the determined geographical location.

19. The system of claim 11, wherein each of the limited functionality of the data provider system, and the full functionality of the data provider system, utilizes the second subset of the personal information of the user based on the privacy policy.

20. The system of claim 11, wherein the processing circuitry is further configured to receive the user interface input by determining whether an indication that indicates a consent to access the first subset of the personal information of the user has been received from the user prior to the selecting of the at least one data item or the one or more data items.

* * * * *